(12) United States Patent
Taguchi et al.

(10) Patent No.: US 9,978,404 B2
(45) Date of Patent: May 22, 2018

(54) MAGNETIC RECORDING HEAD AND DISK DEVICE WITH THE SAME

(71) Applicant: Kabushiki Kaisha Toshiba, Minato-ku, Tokyo (JP)

(72) Inventors: Tomoko Taguchi, Kunitachi Tokyo (JP); Yusuke Tomoda, Zama Kanagawa (JP); Kenichiro Yamada, Tokyo (JP); Satoshi Shirotori, Yokohama Kanagawa (JP); Naoyuki Narita, Fujisawa Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 321 days.

(21) Appl. No.: 14/797,599

(22) Filed: Jul. 13, 2015

(65) Prior Publication Data

US 2016/0314809 A1 Oct. 27, 2016

(30) Foreign Application Priority Data

Apr. 22, 2015 (JP) .................. 2015-087511

(51) Int. Cl.
*G11B 5/127* (2006.01)
*G11B 5/31* (2006.01)
*G11B 5/00* (2006.01)

(52) U.S. Cl.
CPC ............ *G11B 5/314* (2013.01); *G11B 5/1278* (2013.01); *G11B 2005/0024* (2013.01)

(58) Field of Classification Search
CPC .............................. G11B 2005/0021
USPC .............. 360/125.3, 125.31–125.32, 125.71, 360/125.74–125.75
See application file for complete search history.

(56) References Cited

U.S. PATENT DOCUMENTS

| 8,363,355 | B2 | 1/2013 | Mochizuki et al. |
| 8,687,322 | B1 | 4/2014 | Matsumoto et al. |
| 2012/0262821 | A1 | 10/2012 | Taguchi et al. |
| 2013/0250456 | A1 | 9/2013 | Yamada et al. |

FOREIGN PATENT DOCUMENTS

| JP | 2012-066240 A | 4/2012 |
| JP | 2013-196748 A | 9/2013 |

*Primary Examiner* — Carlos E Garcia
(74) *Attorney, Agent, or Firm* — White & Case LLP

(57) ABSTRACT

According to one embodiment, a magnetic recording head includes an air bearing surface, a magnetic pole having a distal end portion, a write shield opposed to the distal end portion of the magnetic pole across a write gap, and a high-frequency oscillator between the magnetic pole and the write shield in the write gap. The high-frequency oscillator includes a spin injection layer, an intermediate layer and an oscillation layer which are stacked in a head travel direction. A film thickness of the spin injection layer in the head travel direction at a height position away from the air bearing surface is greater than a film thickness of the spin injection layer in the head travel direction on the air bearing surface.

20 Claims, 20 Drawing Sheets

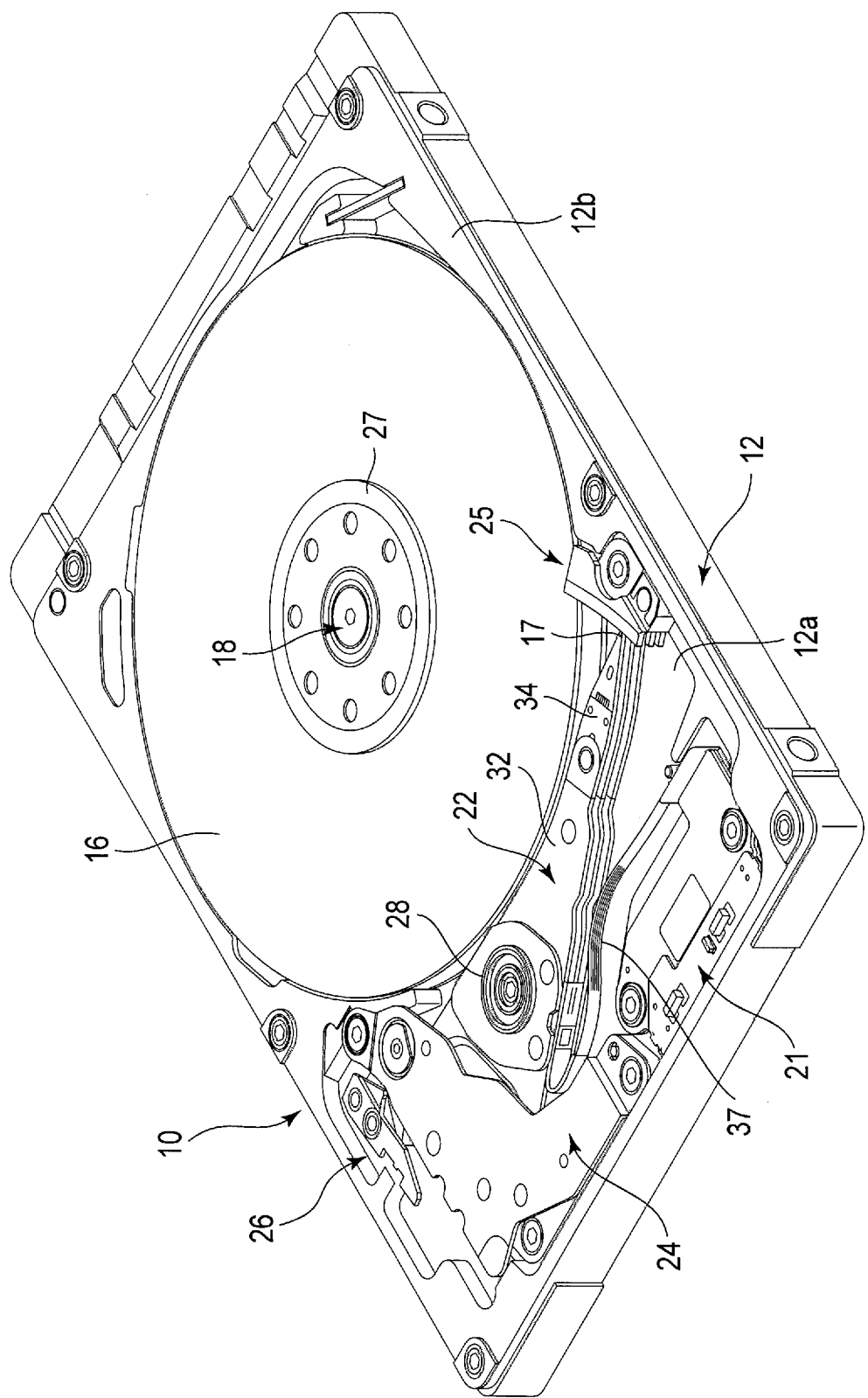
F I G. 1

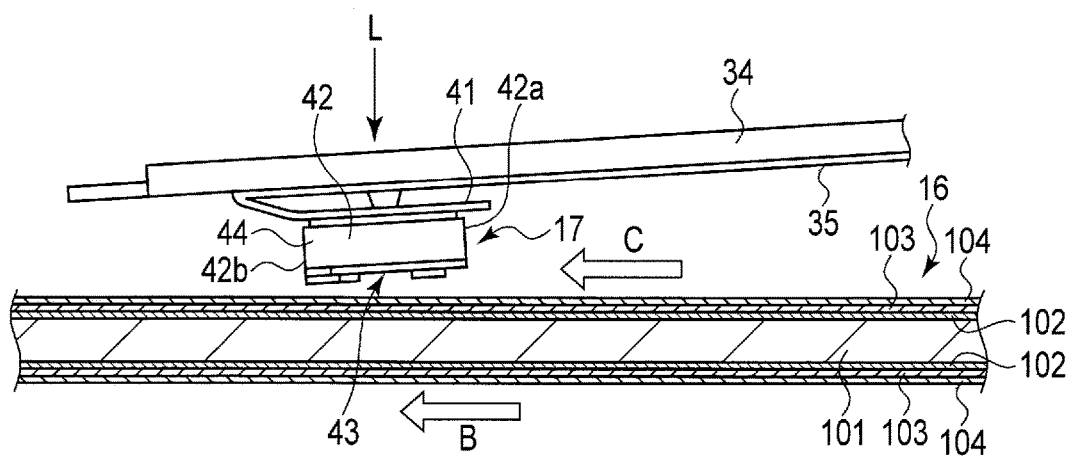
F I G. 2

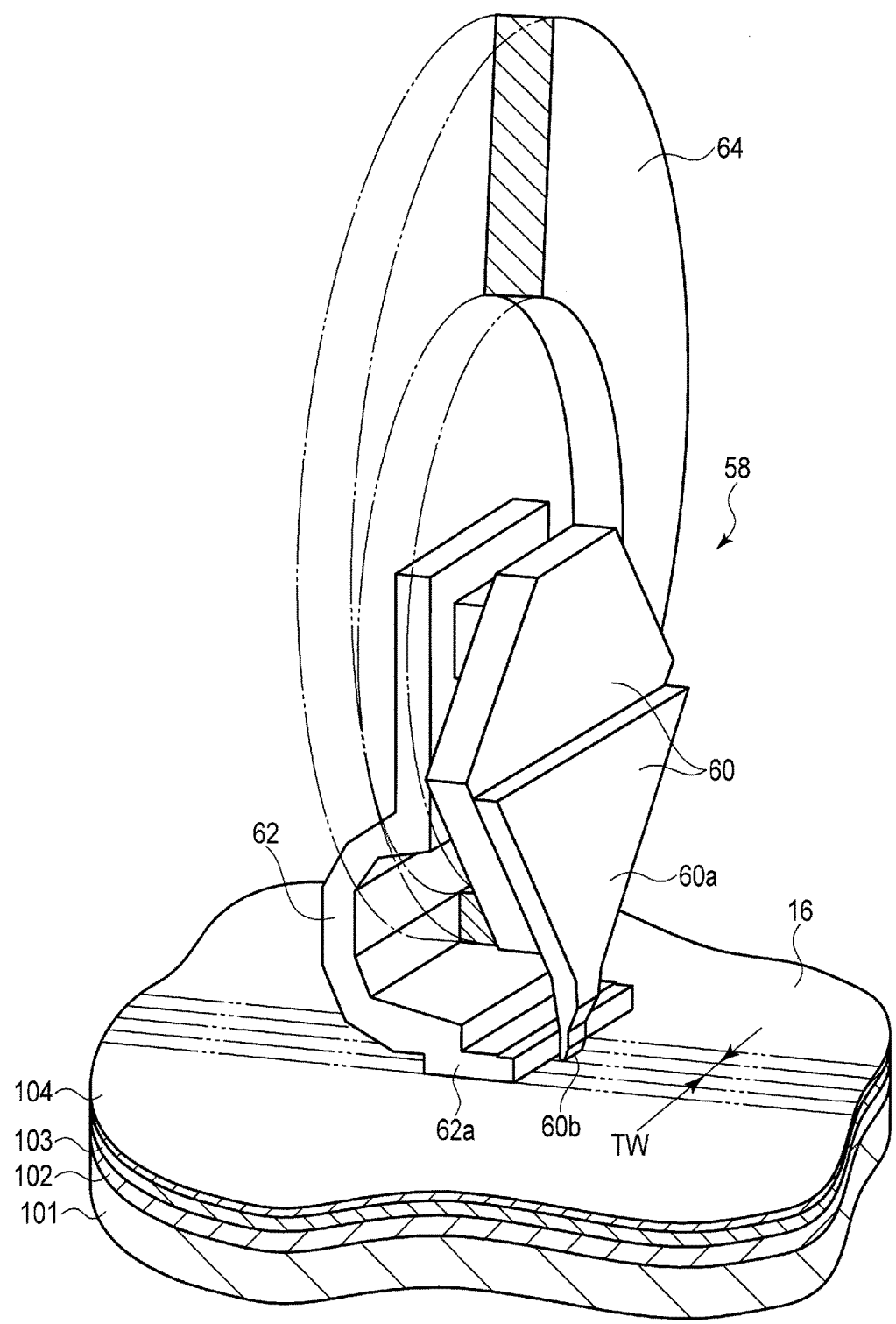
F I G. 4

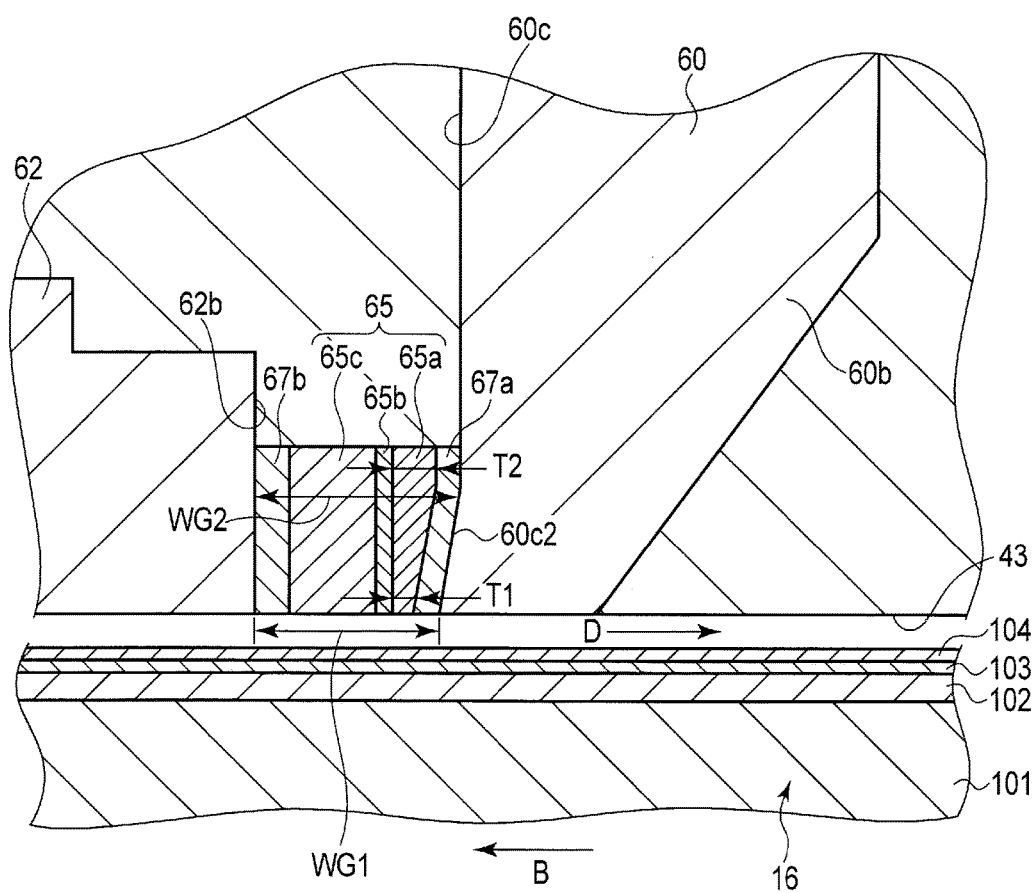
F I G. 6

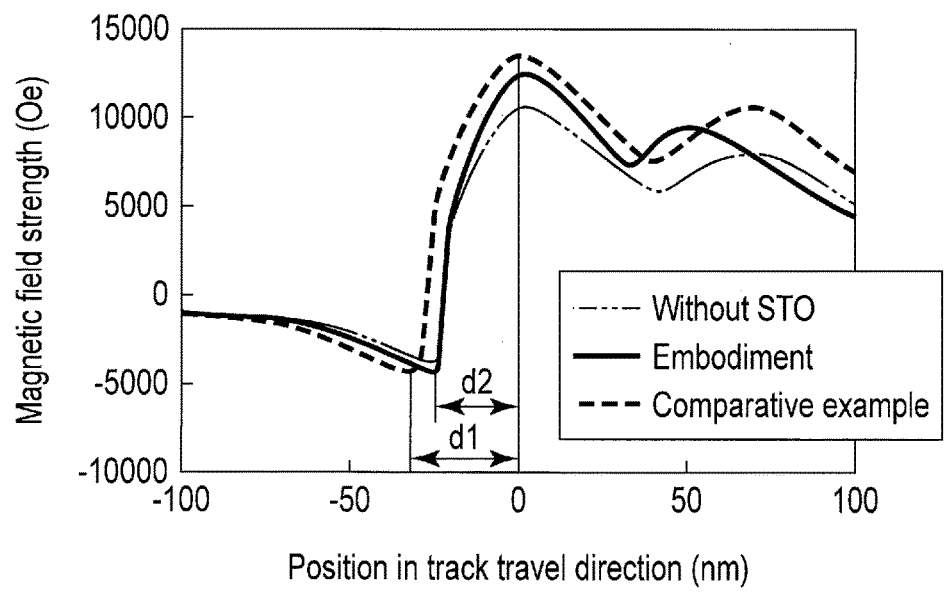
F I G. 7A
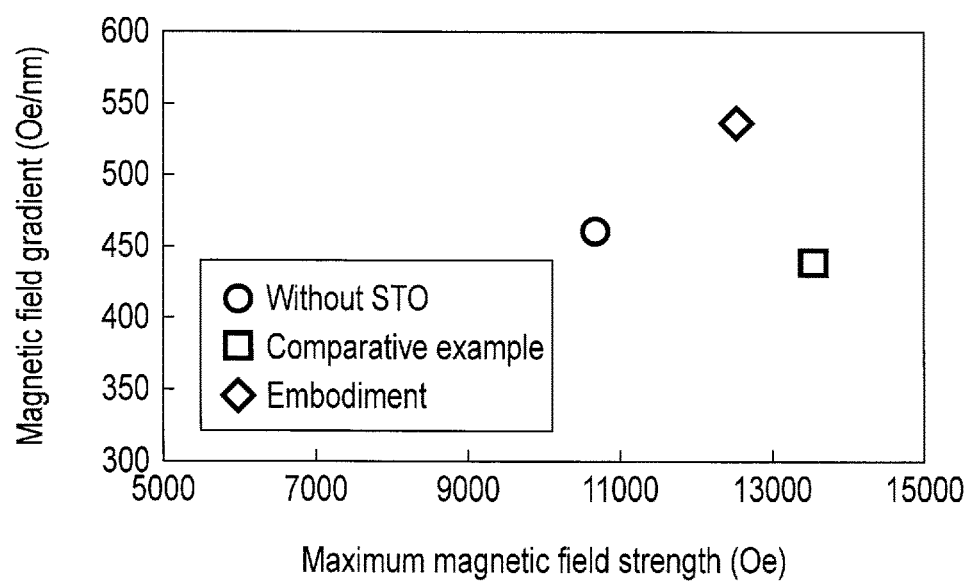
F I G. 7B

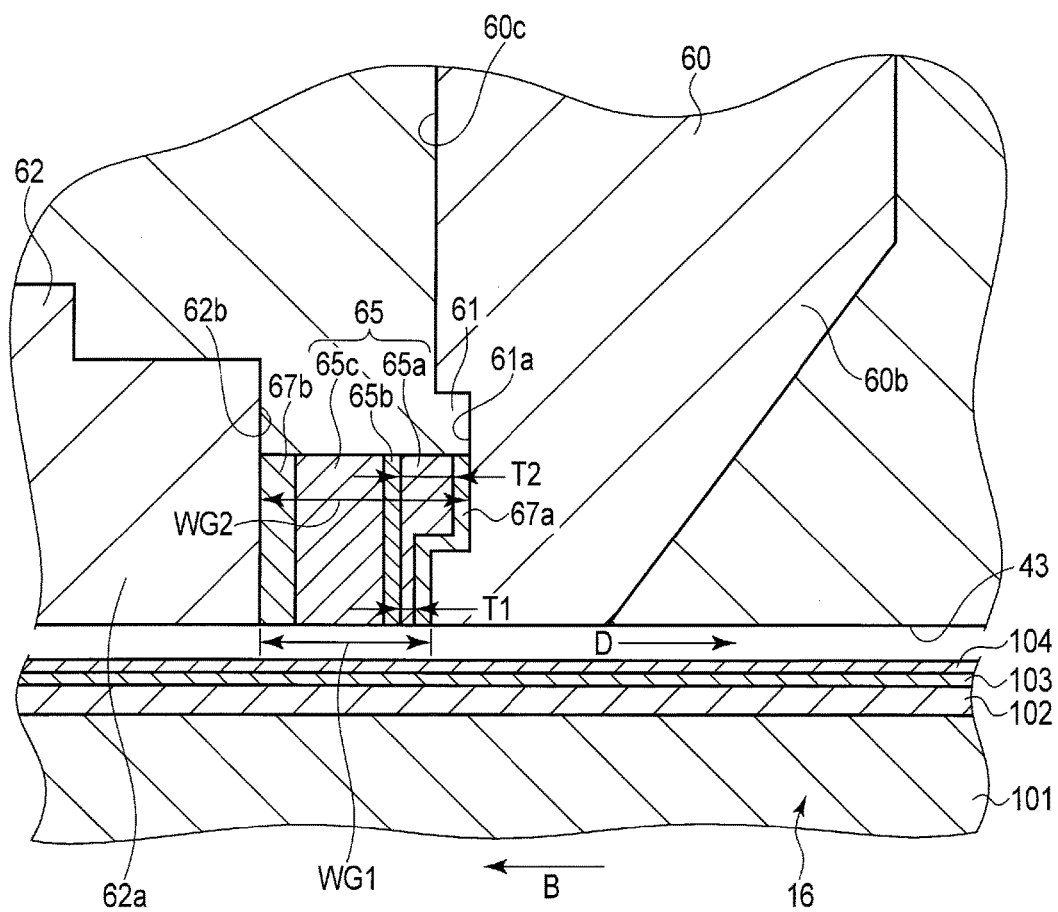
F I G. 8

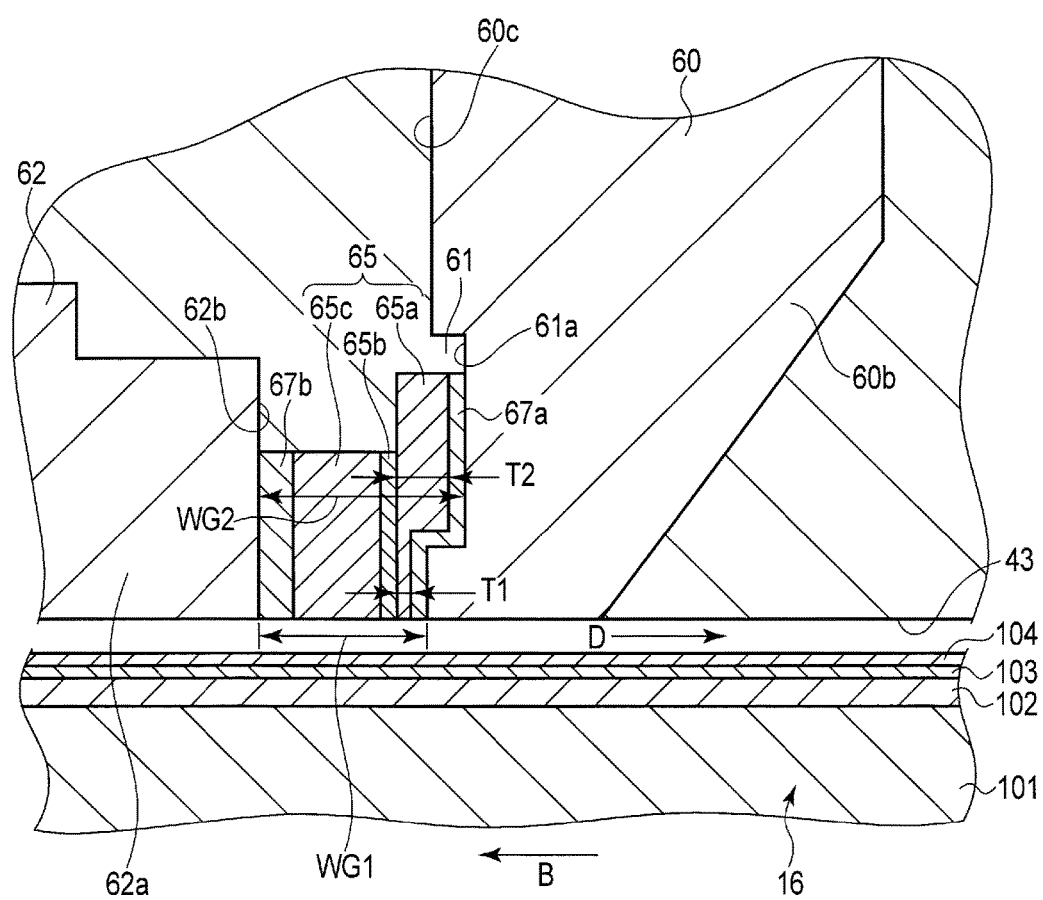
F I G. 9

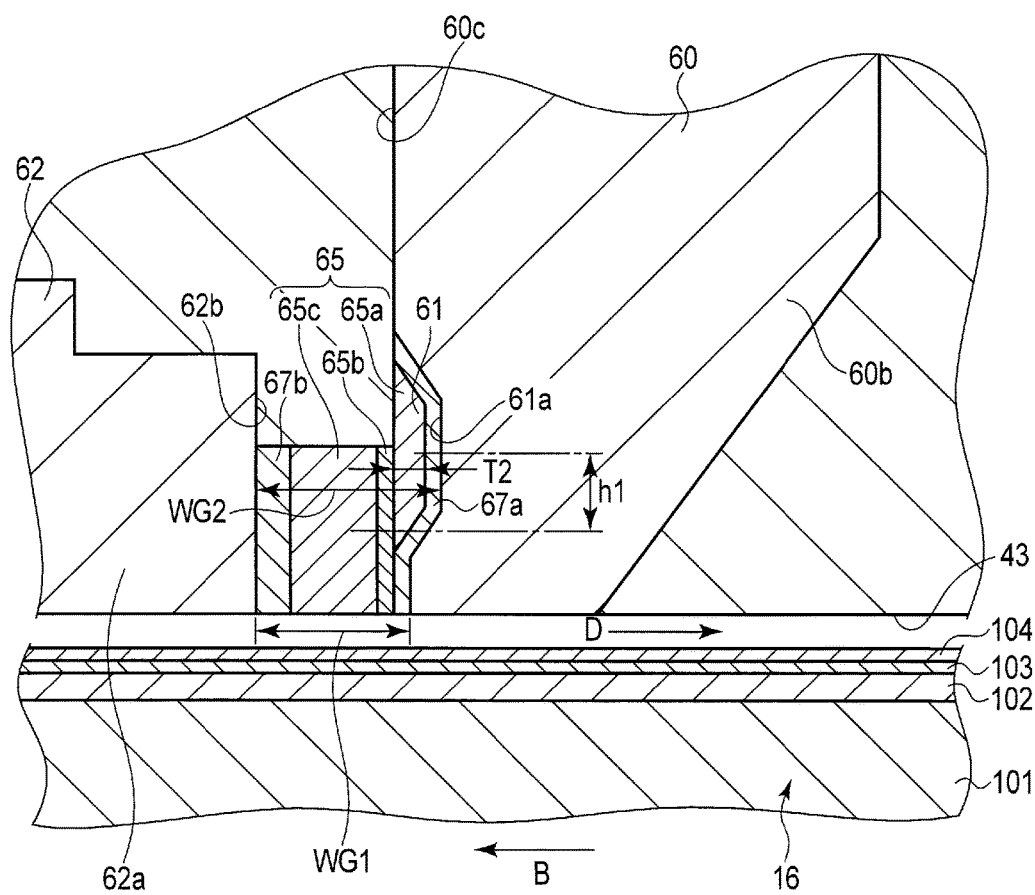
F I G. 11

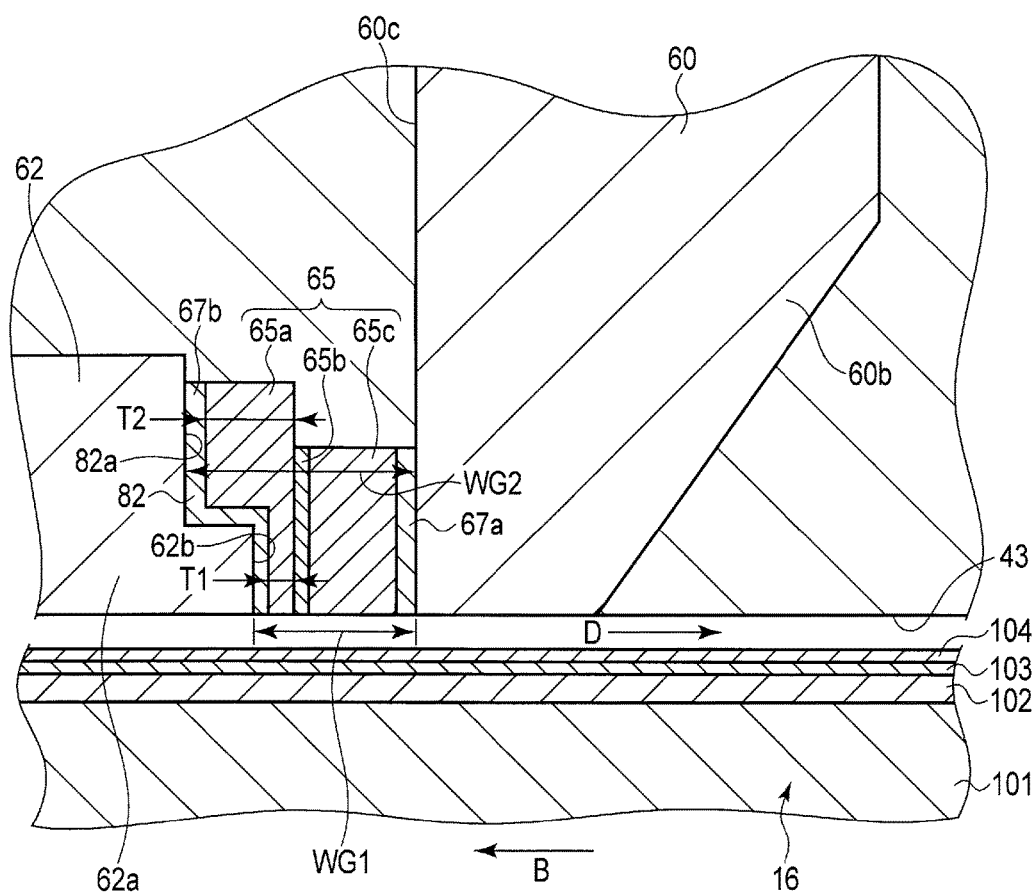
F I G. 14

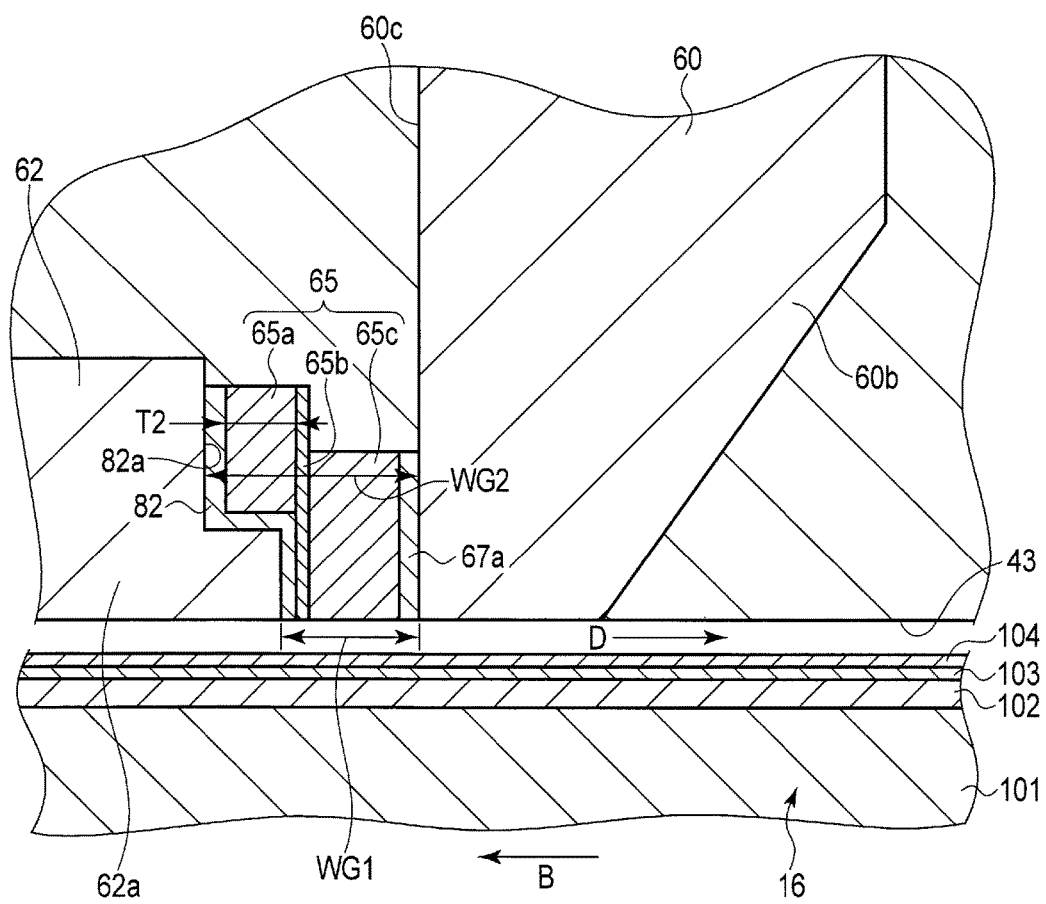
F I G. 15

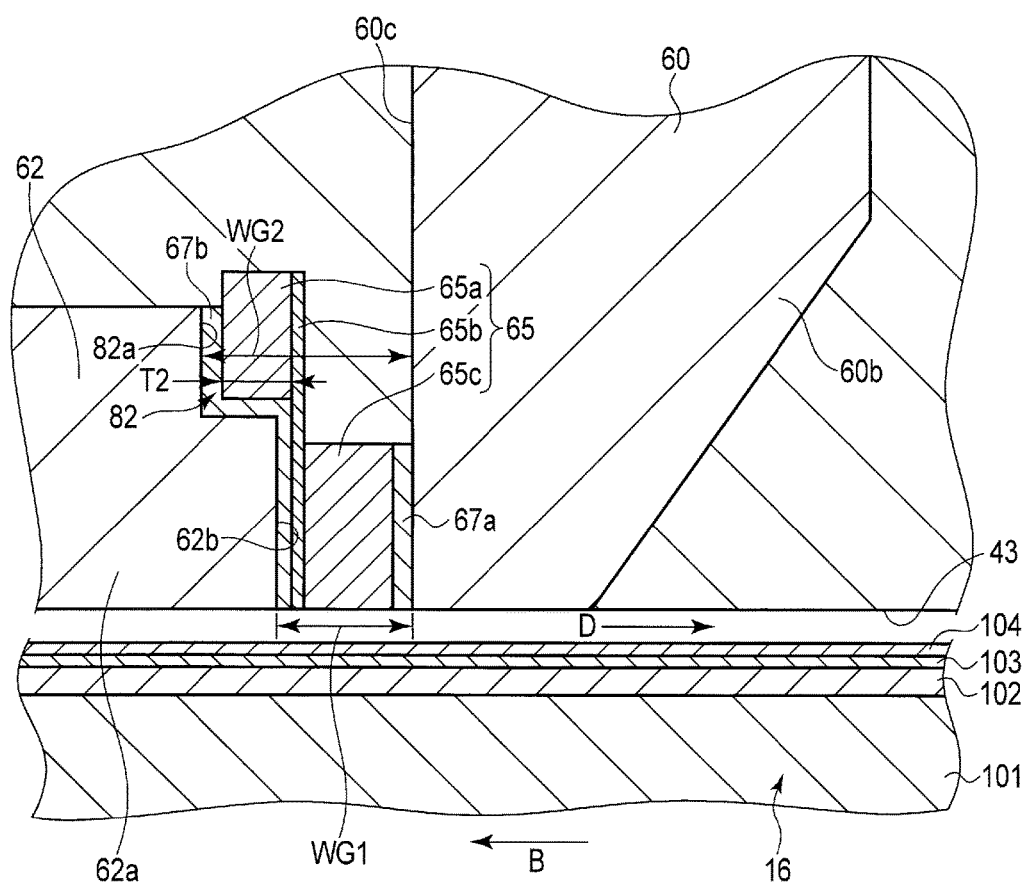
F I G. 16

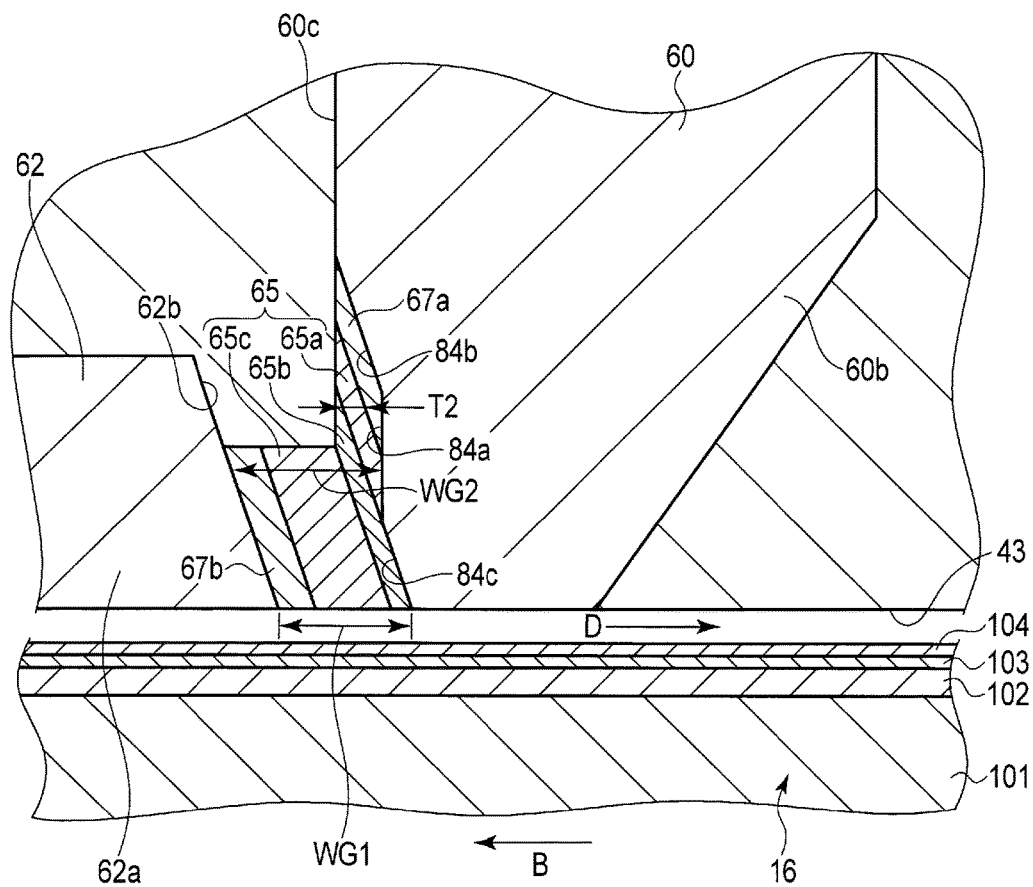
F I G. 18

MAGNETIC RECORDING HEAD AND DISK DEVICE WITH THE SAME

CROSS-REFERENCE TO RELATED APPLICATIONS

This application is based upon and claims the benefit of priority from Japanese Patent Application No. 2015-087511, filed Apr. 22, 2015, the entire contents of which are incorporated herein by reference.

FIELD

Embodiments described herein relate generally to a magnetic recording head comprising a high-frequency assisted element and a disk device comprising the magnetic recording head.

BACKGROUND

In recent years, a magnetic head for perpendicular magnetic recording has been suggested to realize high recording density, large capacity or miniaturization of a magnetic disk device as a disk device. In this type of magnetic head, a recording head includes a main magnetic pole which produces a perpendicular magnetic field, a write shield magnetic pole provided on the trailing side of the main magnetic pole across an intervening write gap, and a coil for supplying a magnetic flux to the main magnetic pole. Further, there is suggested a high-frequency (microwave) assisted head wherein a microwave assisted element such as a spin-torque oscillator is provided in the write gap between the medium-side end portion of the write shield magnetic pole and the main magnetic pole. Current is supplied to the spin-torque oscillator through the main magnetic pole and the write shield magnetic pole.

In the high-frequency assisted head, the spin injection layer and the oscillation layer of the high-frequency assisted element are allocated in the write gap. Each of the spin injection layer and the oscillation layer has a constant film thickness from the air bearing surface (ABS) side of the head to a position away from the ABS in a perpendicular direction (in other words, a deep position). Normally, in the write gap, the head travel direction component of the gap magnetic field is stronger in a position away from the ABS in a perpendicular direction (in other words, a deep position) than near the ABS. Thus, the magnetic field is not uniform in the height direction of the write gap. The magnetization of the spin injection layer easily points in the head travel direction in the deep position away from the ABS; however, the magnetization of the spin injection layer easily becomes unstable on the ABS side. The magnetization of the spin injection layer is difficult to point in a certain direction, and thus, the magnetization of the oscillation layer is difficult to uniformly rotate. As a result, good oscillation cannot be obtained. It is difficult to assure energy sufficient to invert the magnetization in the recording layer of the recording medium.

BRIEF DESCRIPTION OF THE DRAWINGS

FIG. 1 is a perspective view showing a hard disk drive (HDD) according to a first embodiment;

FIG. 2 is a side view showing a magnetic head and a suspension in the HDD;

FIG. 4 is a perspective view schematically showing a recording head of the magnetic head;

FIG. 6 is an enlarged cross-sectional view taken along a track center of an ABS-side end portion of a recording head of an HDD according to a second embodiment;

FIG. 7A is a view showing comparison of the relationship between the position in a track travel direction and the magnetic field strength with respect to three recording heads;

FIG. 7B is a view showing comparison of the relationship between the maximum magnetic field strength extracted from the magnetic field distribution shown in FIG. 7A and the magnetic field gradient on the trailing end side with respect to three recording heads;

FIG. 8 is an enlarged cross-sectional view taken along a track center of an ABS-side end portion of a recording head of an HDD according to a third embodiment;

FIG. 9 is an enlarged cross-sectional view taken along the track center of the ABS-side end portion of the recording head of the HDD according to a first modification example;

FIG. 11 is an enlarged cross-sectional view taken along a track center of an ABS-side end portion of a recording head of an HDD according to a fourth embodiment;

FIG. 14 is an enlarged cross-sectional view taken along a track center of an ABS-side end portion of a recording head of an HDD according to a sixth embodiment;

FIG. 15 is an enlarged cross-sectional view taken along a track center of an ABS-side end portion of a recording head of an HDD according to a seventh embodiment;

FIG. 16 is an enlarged cross-sectional view taken along a track center of an ABS-side end portion of a recording head of and HDD according to an eighth embodiment;

FIG. 18 is an enlarged cross-sectional view taken along a track center of an ABS-side end portion of a recording head of an HDD according to a tenth embodiment.

DETAILED DESCRIPTION

Figure 3:
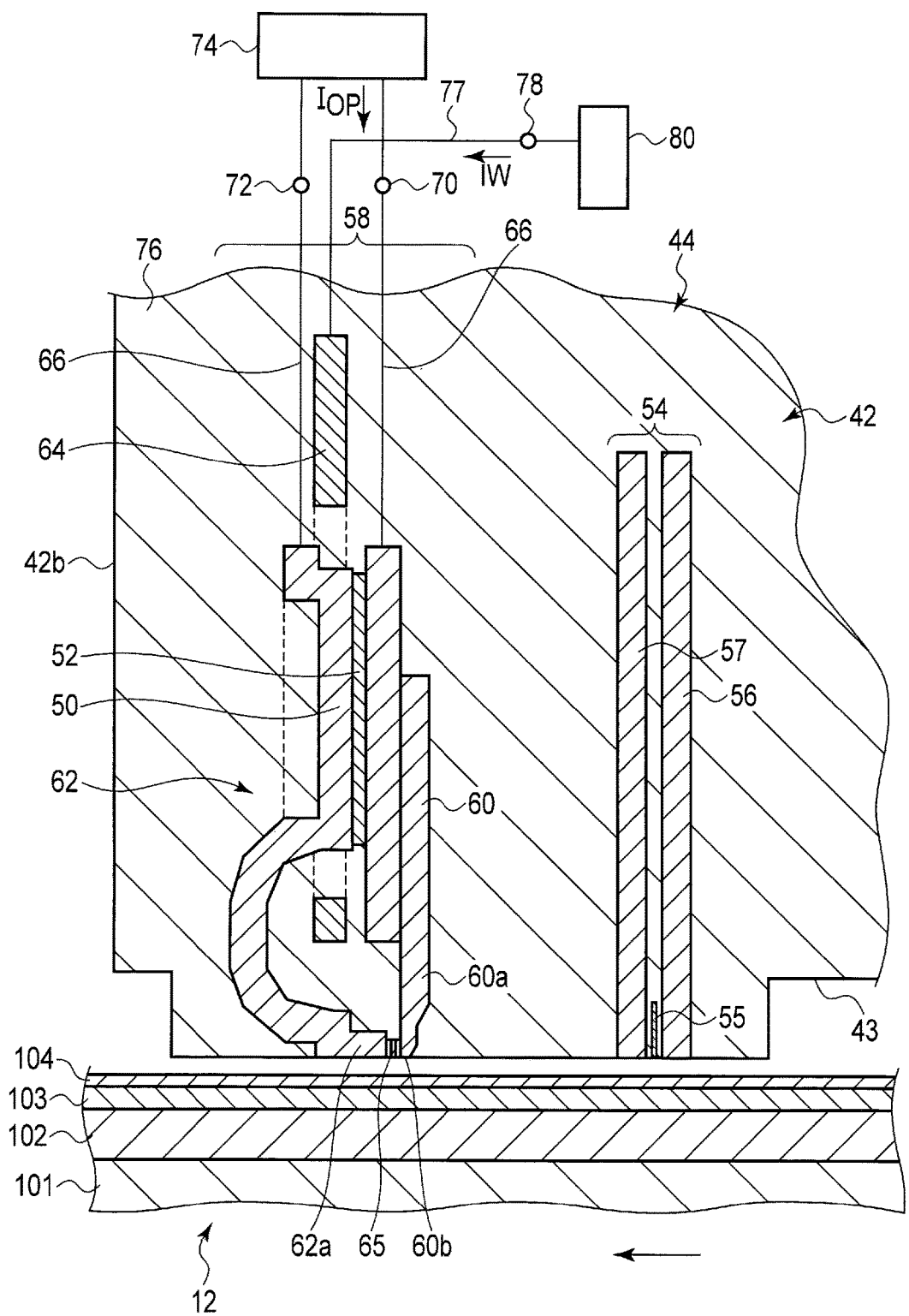
FIG. 3 is a cross-sectional view showing an enlarged view of a head portion of the magnetic head.

Various embodiments will be described hereinafter with reference to the accompanying drawings. In general, according to one embodiment, a magnetic recording head comprises: an air bearing surface; a magnetic pole which comprises a distal end portion extending to the air bearing surface and is configured to produce a recording magnetic field; a write shield opposed to the distal end portion of the magnetic pole across a write gap; and a high-frequency oscillator which is provided between the magnetic pole and the write shield in the write gap and is connected to the magnetic pole and the write shield. The high-frequency oscillator comprises a spin injection layer, an intermediate layer and an oscillation layer which are stacked in a head travel direction. Each of the oscillation layer and the spin injection layer comprises a stack surface extending in a direction intersecting with the air bearing surface. A film thickness of the spin injection layer in the head travel direction at a height position away from the air bearing surface is greater than the film thickness of the spin injection layer in the head travel direction on the air bearing surface.

Hereinafter, a hard disk drive (HDD) according to an embodiment, which functions as a disk device, will be explained in detail.

What is disclosed in this specification is merely an example. Appropriate modifications which can be easily conceived by a person ordinarily skilled in the art without departing from the spirit of the embodiments naturally fall within the scope of the present invention. To further clarify explanation, for example, the width, thickness or shape of each structure may be schematically shown in the drawings compared with the actual forms. Note that the drawings are merely examples and do not limit the interpretation of the present invention. In the specification and drawings, elements which are identical to those of the already-mentioned figures are denoted by the same reference numbers. Thus, the detailed explanation of such elements may be omitted.

First Embodiment

FIG. 1 shows an internal structure of an HDD according to a first embodiment, with a top cover detached therefrom, and FIG. 2 schematically a magnetic disk and a magnetic head being in a flying state. As shown in FIG. 1, the HDD comprises a housing 10. The housing 10 comprises a base 12 having the shape of a rectangular box which is open on its upper side, and a top cover (not shown) which is secured to the base 12 by a plurality of screws and closes the upper end opening of the base 12. The base 12 includes a rectangular bottom wall 12a and a side wall 12b provided upright along a peripheral edge of the bottom wall 12a.

In the housing 10 are arranged two magnetic disks 16 as recording mediums, and a spindle motor 18 provided as a drive section which supports and rotates the magnetic disks 16. The spindle motor 18 is provided on the bottom wall 12a. Each magnetic disk 16 is formed so as to have a diameter of, for example, 65 mm (2.5 inches) and comprises a magnetic recording layer on the upper and lower surfaces. The magnetic disks 16 are engaged coaxially with a hub (not shown) of the spindle motor 18, clamped by a clamp spring 27, and thereby fixed to the hub. The magnetic disks 16 are supported in parallel with the bottom wall 12a of the base 12. The magnetic disks 16 are rotated at a predetermined speed by the spindle motor 18.

A plurality of magnetic heads 17 and a carriage assembly 22 are arranged in the housing 10. The magnetic heads 17 are configured to write and read information on and from the magnetic disks 16, and the carriage assembly 22 supports the magnetic heads 17 such that they are movable with respect to the magnetic disks 16. In the housing 10 are arranged a voice coil motor (VCM) 24, a ramp load mechanism 25, a latch mechanism 26 and a flexible printed circuit board (FPC) unit 21. The VCM 24 rotates and positions the carriage assembly 22, the ramp load mechanism 25 holds the magnetic heads 17 in unload positions where they are separated from the magnetic disks 16, when the magnetic heads 17 are moved to outermost circumferential part of the magnetic disks 16, the latch mechanism 26 holds the carriage assembly 22 in a retreat position when an impact or the like acts on the HDD, and the FPC unit 21 includes electronic components such as a conversion connector, etc.

A control circuit board (not shown) is screwed to the external surface of the base 12 and faces the bottom wall 12a. The control circuit board controls the operation of the spindle motor 18, and controls the operations of the VCM 24 and the magnetic heads 17 through the FPC unit 21.

The carriage assembly 22 comprises a bearing unit 28 secured onto the bottom wall 12a of the base 12, a plurality of arms 32 extending from the bearing unit 28, and suspensions 34 which are capable of elastically deforming and have the shape of a slender plate. The base end of the suspension 34 is secured to the distal end of each arm 32 by spot welding or adhesion. The suspension 34 extends from the arm 32. The magnetic heads 17 are supported on the extended ends of the suspensions 34. The suspensions 34 and the magnetic heads 17 face each other with the magnetic disks 16 being interposed.

As shown in FIG. 2, each magnetic head 17 is structured as a flying head, and comprises a slider 42 having the shape of a substantially rectangular parallelepiped and a head portion 44 for writing (recording) and reading at the outflow end (trailing end) of the slider 42. The magnetic head 17 is secured to a gimbal spring 41 provided at the distal end portion of the suspension 34. A head load L toward the surface of the magnetic disk 16 is applied to each magnetic head 17 by the elasticity of the suspension 34. As shown in FIG. 1 and FIG. 2, each magnetic head 17 is electrically connected to the FPC unit 21 via a trace member 35 secured onto the suspension 34 and the arm 32, and a relay FPC 37.

Then, the structures of the magnetic disks 16 and the magnetic heads 17 will be described in detail. FIG. 3 is an enlarged cross-sectional view of the head portion 44 of the magnetic head 17 and the magnetic disk 16.

As shown in FIGS. 1 to 3, the magnetic disk 16 comprises a substrate 101 formed of a nonmagnetic material in the shape of a circular disk having a diameter of, for example, approximately 2.5 inches (6.35 cm). On each surface of the substrate 101, a soft magnetic layer 102 as a foundation layer, a magnetic recording layer 103 and a protective film layer 104 are stacked in order. The soft magnetic layer 102 is formed of a material showing soft magnetic properties. The magnetic recording layer 103 has magnetic anisotropy in a direction perpendicular to the disk surface.

As shown in FIGS. 2 and 3, the slider 42 of the magnetic head 17 is formed by, for example, a sintered body (AlTiC) of alumina and titanium-carbide. The head portion 44 is formed by stacking thin films. The slider 42 comprises a rectangular disk-facing surface (air bearing surface [ABS]) 43 facing the surface of the magnetic disk 16. The slider 42 is caused to fly by an air flow C produced between the disk surface and the ABS 43 by the rotation of the magnetic disk 16. The direction of the air flow C conforms to a rotational direction B of the magnetic disk 16. The slider 42 is provided such that the longitudinal direction of the ABS 43 substantially conforms to the direction of the air flow C relative to the surface of the magnetic disk 16.

The slider 42 comprises a leading end 42a located on the inflow side of the air flow C and a trailing end 42b located on the outflow side of the air flow C. On the ABS 43 of the slider 42, for example, a leading step, a trailing step, a side step and a negative-pressure cavity are formed (not shown).

As shown in FIG. 3, the head portion 44 comprises a reading (reproduction) head 54 and a recording head (magnetic recording head) 58 which are formed by a thin-film process at the trailing end 42b of the slider 42. Thus, the head portion 44 is formed as a separation type of magnetic head. The reading head 54 and the recording head 58 are covered by a protective insulating film 76 excluding the portions exposed to the ABS 43 of the slider 42. The protective insulating film 76 forms the outer shape of the head portion 44.

The reading head 54 comprises a magnetic film 55 having a magnetoresistive effect, and shield films 56 and 57 provided on the trailing and leading sides of the magnetic film 55 so as to sandwich the magnetic film 55. The lower ends of the magnetic film 55 and the shield films 56 and 57 are exposed to the ABS 43 of the slider 42.

Figure 5:
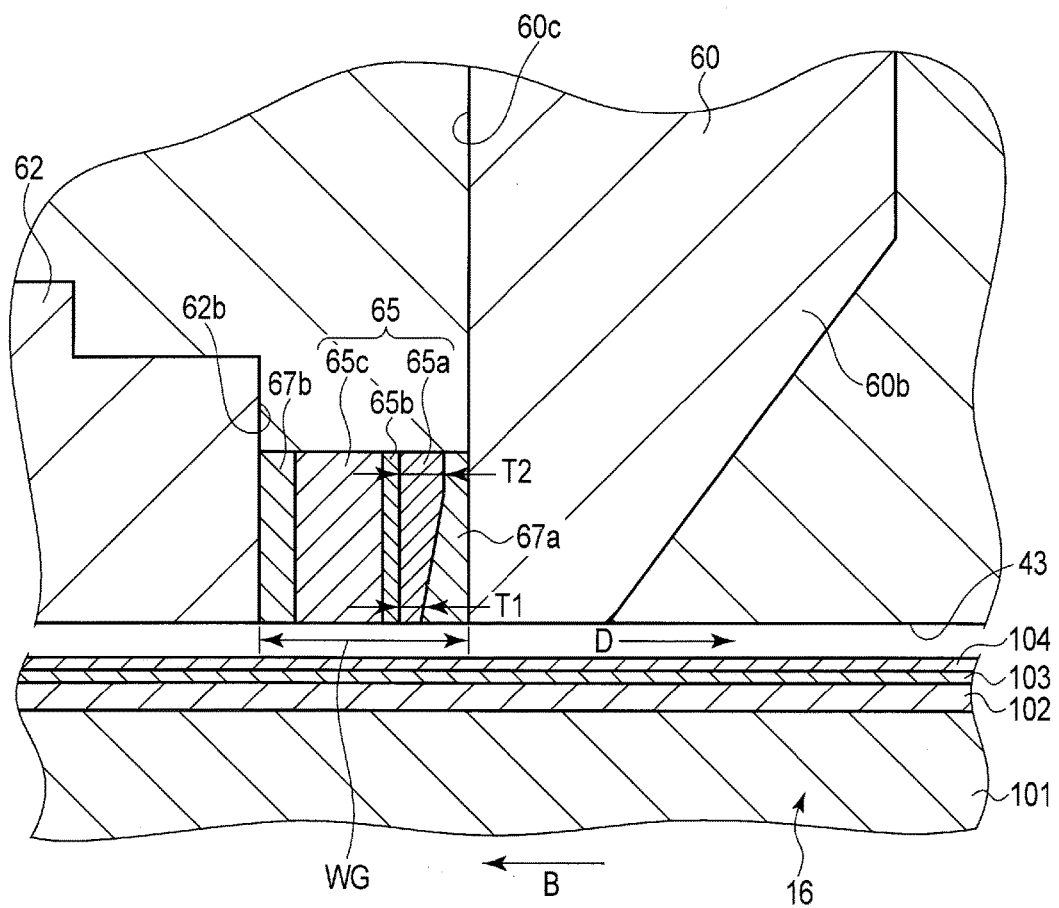
FIG. 5 is an enlarged cross-sectional view taken along a track center of an ABS-side end portion of the recording head.

The recording head 58 is provided on the trailing end 42b side of the slider 42 relative to the reading head 54. FIG. 4 is a perspective view schematically showing the recording head 58 and the magnetic disk 16. FIG. 5 is an enlarged cross-sectional view taken along the track center of the end portion of the recording head 58 on the magnetic disk 16 side.

As shown in FIGS. 3 to 5, the recording head 58 comprises: a main magnetic pole 60 which is formed of a high-saturated magnetized material producing a recording magnetic field in a direction perpendicular to the surface of the magnetic disk 16; a trailing shield (write shield) 62 which is formed of a soft magnetic material and is provided to effectively close the magnetic path via the soft magnetic layer 102 immediately under the main magnetic pole 60; a recording coil 64 which is provided so as to wind around a magnetic core (magnetic circuit) including the main magnetic pole 60 and the trailing shield 62 in order to supply a magnetic flux to the main magnetic pole 60 when a signal is written to the magnetic disk 16; and a high-frequency (microwave) oscillator, for example, a spin torque oscillator (STO) 65 which is formed of a nonmagnetic conductive material and is provided in the portion facing the ABS 43 between a distal end portion 60b of the main magnetic pole 60 on the ABS 43 side and the trailing shield 62.

The main magnetic pole 60 formed of a soft magnetic material extends substantially perpendicularly to the surface of the magnetic disk 16 and the ABS 43. The lower end portion of the main magnetic pole 60 on the ABS 43 side comprises a tapered portion 60a and the distal end portion 60b. The tapered portion 60a tapers towards the ABS 43 and narrows down into a funnel shape in the track width direction. The distal end portion 60b extends from the tapered portion 60a to the magnetic disk side and has a predetermined width. The distal end, in other words, the lower end of the distal end portion 60b is exposed to the ABS 43 of the magnetic head. The width of the distal end portion 60b in the track width direction substantially corresponds to a track width TW in the magnetic disk 16. The main magnetic pole 60 comprises a shield-side end surface 60c which extends substantially perpendicularly to the ABS 43 and faces the trailing side.

The trailing shield 62 formed of a soft magnetic material has a substantially L-shape. The trailing shield 62 comprises a distal end portion 62a facing the distal end portion 60b of the main magnetic pole 60 across an intervening write gap, and a connection portion (back gap portion) 50 which is away from the ABS 43 and is connected to the main magnetic pole 60. The connection portion 50 is connected to the upper portion of the main magnetic pole 60, in other words, to the upper portion away from the ABS 43 to the deep side or the upper side, via a nonconductive material 52.

The distal end portion 62a of the trailing shield 62 is formed in the shape of a slender rectangle. The lower end surface of the trailing shield 62 is exposed to the ABS 43 of the slider 42. A leading-side end surface (main-magnetic-pole-side end surface) 62b of the distal end portion 62a extends substantially perpendicularly to the ABS 43 and extends along the track width direction of the magnetic disk 16. The leading-side end surface 62b faces the shield-side end surface 60c of the main magnetic pole 60 substantially in parallel across an intervening write gap WG in the lower end portion of the main magnetic pole 60 (in other words, some parts of the distal end portion 60b and the tapered portion 60a).

As shown in FIG. 5, the STO 65 is provided between the distal end portion 60b of the main magnetic pole 60 and the trailing shield 62 in the write gap WG and is partially exposed to the ABS 43. The STO 65 comprises a spin injection layer 65a, an intermediate layer (nonmagnetic conductive layer) 65b and an oscillation layer 65c and is structured by stacking these layers in order from the main magnetic pole 60 side to the trailing shield 62 side; in other words, in a travel direction D of the magnetic head 17. The spin injection layer 65a is connected to the shield-side end surface 60c of the main magnetic pole 60 via a nonmagnetic conductive layer (foundation layer) 67a. The oscillation layer 65c is attached to the leading-side end surface 62b of the trailing shield 62 via a nonmagnetic conductive layer (cap layer) 67b. The stacking order of the spin injection layer 65a, the intermediate layer 65b and the oscillation layer 65c may be opposite to the above order. In other words, these layers may be stacked in order from the trailing shield 62 side to the main magnetic pole 60 side.

Each of the spin injection layer 65a, the intermediate layer 65b and the oscillation layer 65c comprises a stack surface or a film surface extending in a direction intersecting with the ABS 43, for example, in a direction perpendicular to the ABS 43. The lower end surface of the STO 65 is exposed to the ABS 43 and is formed as the same plane as the ABS 43, i.e., flush with the ABS 43. The width of the STO 65 is set so as to be substantially equal to the track width TW. The height of the STO 65 (the height in a direction perpendicular to the ABS 43) is substantially equal to or less than that of the leading-side end surface 62b of the trailing shield 62.

As shown in FIG. 5, the thickness of the oscillation layer 65c in the head travel direction (track travel direction) D (in other words, the direction which is parallel with the ABS 43 and intersects with the stack surface of the STO) is substantially constant from the ABS 43 to the upper end (the deep-side end) of the oscillation layer 65c. In a similar manner, the thickness of each of the intermediate layer 65b and the cap layer 67b in the travel direction D is substantially constant. With respect to the thickness of the spin injection layer 65a in the travel direction D, film thickness T2 in the deep-side portion perpendicularly away from the ABS 43 to the deep side is greater than film thickness T1 in the end portion on the ABS 43 side. Film thickness T2 is preferably approximately 1.1 to 5 times film thickness T1.

In the present embodiment, the lower end surface of the spin injection layer 65a on the ABS 43 side is located on the same plane as the lower end surface of the oscillation layer 65c and is exposed to the ABS 43. In the foundation layer 67a, the thickness in the lower end portion on the ABS 43 side is greater than that in the deep-side end portion in accordance with the spin injection layer 65a. The thickness of the spin injection layer 65a may be increased continuously or by stages from the ABS 43 side to the deep side (upper end side). In the thickness of the spin injection layer 65a, the upper-end-side portion has only to be thicker than the end portion on the ABS side. The part located above a mid-portion of the spin injection layer 65a in the height direction may have a constant thickness.

As shown in FIG. 3, the main magnetic pole 60 and the trailing shield 62 are connected to a power source 74 via an interconnection 66 and connection terminals 70 and 72. A current circuit is structured such that current Iop can be supplied from the power source 74 through the interconnection 66, the main magnetic pole 60, the STO 65 and the trailing shield 62 in series.

For example, the recording coil 64 winds around the connection portion 50 between the main magnetic pole 60 and the trailing shield 62. The recording coil 64 is connected to a terminal 78 via an interconnection 77. A second power source 80 is connected to the terminal 78. Recording current Iw supplied from the second power source 80 to the recording coil 64 is controlled by the control unit of the HDD. When a signal is written to the magnetic disk 16, a predetermined recording current Iw is supplied from the second power source 80 to the recording coil 64. A magnetic flux is supplied to the main magnetic pole 60, thereby producing a recording magnetic field.

According to the HDD structured in the above manner, when the VCM 24 is driven, the carriage assembly 22 is rotated. The magnetic head 17 is moved onto the desired track of the magnetic disk 16, and the position of the magnetic head 17 is determined. As shown in FIG. 2, the magnetic head 17 is caused to fly by the air flow C produced between the disk surface and the ABS 43 because of the rotation of the magnetic disk 16. When the HDD is operated, the ABS 43 of the slider 42 faces the disk surface, maintaining a space from the disk surface. In this state, recording data is read by the reading head 54 and data is written by the recording head 58 relative to the magnetic disk 16.

In writing data, as shown in FIG. 3, direct current is supplied from the power source 74 to the main magnetic pole 60, the STO 65 and the trailing shield 62. Thus, a high-frequency magnetic field is produced from the STO 65. This high-frequency magnetic field is applied to the magnetic recording layer 103 of the magnetic disk 16. Alternating current is supplied from the power source 80 to the recording coil 64, and thus, the main magnetic pole 60 is excited by the recording coil 64. From the main magnetic pole 60, a recording magnetic field is perpendicularly applied to the recording layer 103 of the magnetic disk 16 immediately under the main magnetic pole 60. In this manner, data is recorded in the magnetic recording layer 103 with a desired track width. By superimposing a high-frequency magnetic filed on the recording magnetic field, the magnetization inversion of the magnetic recording layer 103 is stimulated. Thus, it is possible to perform magnetic recording of a high magnetic anisotropy energy. By supplying current from the main magnetic pole 60 to the trailing shield 62, the disorder in the magnetic domain of the main magnetic pole 60 can be eliminated. Thus, an efficient magnetic path can be obtained. The magnetic filed produced from the distal end of the main magnetic pole 60 is enhanced.

With regard to the magnetization of the STO 65, normally, a better magnetization rotation in which the magnetization direction is uniform is obtained in a deep position (away from the ABS 43) than in the end portion on the ABS 43 side. In this case, reflection from the magnetization of the STO is generated on the deep side of the ABS of the spin injection layer. Thus, the magnetization of the spin injection layer also starts to waver. According to the present embodiment, in the STO 65, the spin injection layer 65a is thicker in the deep position away from the ABS 43 than at the end on the ABS 43 side. Thus, the magnetization of the spin injection layer is stabilized by the effect of shape anisotropy. In this manner, the magnetization of the oscillation layer 65c is uniform and easily rotates. The oscillation layer can have good oscillation. As a result, it is possible to increase the magnetization inversion energy of the recording layer of the magnetic disk 16 because of the STO 65.

In the above manner, the present embodiment can provide a magnetic recording head realizing stable high-frequency assist and high recording density and a disk device comprising the magnetic recording head.

The following is a description of magnetic recording heads of HDDs according to alternative embodiments. In the description of these alternative embodiments to follow, like reference numerals are used to designate the same parts as those of the first embodiment, and a detailed description thereof is omitted. Elements different from those of the first embodiment are mainly explained in detail.

Second Embodiment

FIG. 6 is an enlarged cross sectional view taken along a track center of a distal end portion of a magnetic recording head in an HDD according to a second embodiment. According to the present embodiment, in a distal end portion 60b of a main magnetic pole 60, an end portion 60c2 of a shield-side end surface 60c on the ABS 43 side, in short, the end portion defining a write gap WG inclines relative to a direction perpendicular to the ABS 43 so as to get closer to a trailing shield 62 toward the ABS 43. In the write gap WG between the shield-side end surface 60c of the main magnetic pole 60 and a leading-side end surface 62b of the trailing shield 62, gap length WG2 in the deep-side portion upwardly away from the ABS 43 in the perpendicular direction is greater than gap length WG1 in the portion facing the ABS 43 (in other words, the gap length in a direction parallel to a head travel direction D and a track). With regard to the thickness of a spin injection layer 65a of an STO 65 in the head travel direction D, film thickness T2 in the deep position away from the ABS 43 is greater than film thickness T1 in the end portion on the ABS 43 side.

Gap length WG2 is preferably formed so as to be approximately 1.1 to 5 times gap length WG1. Gap length WG1 is, for example, approximately 10 to 25 nm. Gap length WG2 is, for example, approximately 30 nm.

Figure 7C:
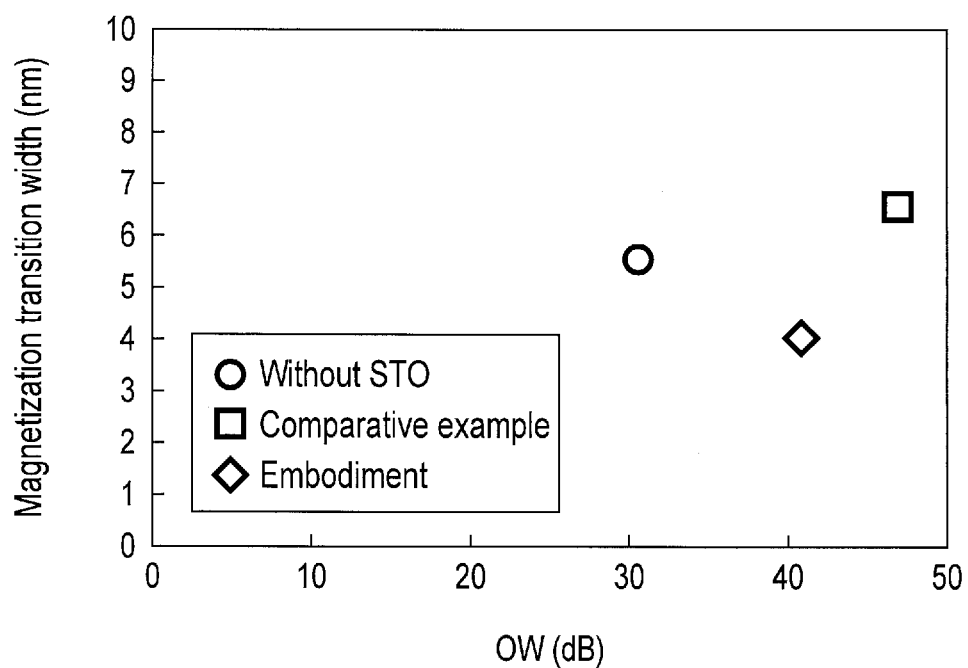
FIG. 7C is a view showing comparison of the relationship between the overwrite (OW) performance by a recording head and the magnetization transition width with respect to three recording heads.

FIG. 7A, FIG. 7B and FIG. 7C show comparison of the recording quality with respect to the recording head in the present embodiment, a recording head without an STO and a recording head in a comparative example. In the recording head of the comparative example, the gap length of an SRO write gap is constant on the ABS side and the deep side, and further, the film thickness of a spin injection layer is constant.

FIG. 7A shows comparison of the relationship between the position in the track travel direction and the magnetic field strength, in other words, comparison of the distribution of the magnetic field strength obtained by a recording head, with respect to three recording heads. FIG. 7B shows comparison of the relationship between the maximum magnetic field strength extracted from the magnetic field distribution shown in FIG. 7A and the magnetic field gradient on the trailing end side with respect to three recording heads.

As is clear from FIG. 7A and FIG. 7B, in the recording head of the comparative example, the maximum value of the magnetic field strength is increased compared with the recording head without an STO. However, since write gap length WG1 is great, distance d1 between the position showing the maximum magnetic field strength in the track travel direction and the position showing the maximum return magnetic field in the track travel direction is greater than distance d2 of the recording head without an STO. Thus, the magnetic field gradient on the trailing end side in the magnetic field distribution is insufficient. In the recording head of the present embodiment, write gap length WG1 in an ABS position is less than write gap length WG2 in a deep position. Thus, distance d2 between the position showing the maximum magnetic field strength in the track travel direction and the position showing the maximum return magnetic field in the track travel direction is small. The magnetic field gradient on the trailing end side in the magnetic filed distribution is improved. The maximum magnetic field strength of the recording head of the present embodiment is greater than that of the recording head without an STO.

FIG. 7C shows comparison of the relationship between the overwrite (OW) performance by a recording head and the magnetization transition width with respect to three recording heads. The figure shows that the OW performance is improved in the recording head of the present embodiment compared with the recording head without an STO. The figure also shows that the magnetization transition width is improved. By the improvement of the magnetization transition width, the recording resolution is enhanced. Thus, the line recording density is improved.

According to the magnetic recording head and the HDD of the second embodiment described above, the spin injection layer is made thicker in a deep position away from the ABS than at the end on the ABS side. By this structure, the magnetization of the spin injection layer easily points in the travel direction in the write gap. The magnetization of the spin injection layer is stabilized. By the stabilization of the magnetization of the spin injection layer, the magnetization of the high-frequency oscillation layer is uniform and easily rotates. Thus, the high-frequency oscillation layer can have good oscillation. In this manner, it is possible to increase the magnetization inversion energy of the recording layer of the recording medium and enhance the overwrite performance.

The write gap length on the ABS can be shortened. The recording resolution of the recording head can be improved. It is possible to improve both the recording resolution and the overwrite performance. The line recording density of the magnetic disk can be improved.

Third Embodiment

FIG. 8 is an enlarged cross-sectional view taken along a track center of a distal end portion of a magnetic recording head in an HDD according to a third embodiment. In the present embodiment, in a distal end portion 60b of a main magnetic pole 60, a shield-side end surface 60c extends perpendicularly to an ABS. A concave portion 61 is formed in a position upwardly away from an ABS 43 (on the deep side) in the perpendicular direction on the shield-side end surface 60c. The concave portion 61 is recessed to the leading side and has a rectangular shape on the cross-sectional surface. The concave portion 61 faces a write gap WG; in other words, faces a leading-side end surface 62b of a trailing shield 62. A bottom surface 61a of the concave portion 61 is away toward the leading side from the shield-side end surface 60c and faces the leading-side end surface 62b of the trailing shield 62 substantially in parallel. In the write gap WG, gap length WG2 in a deep position away from the ABS 43 (in other words, the distance between the leading-side end surface 62b and the bottom surface 61a of the concave portion 61 along a travel direction D) is greater than gap length WG1 at the end on the ABS side.

The upper end (deep) portion of a spin injection layer 65a of an STO 65 away from the ABS 43 partially extends into the concave portion 61. With regard to the thickness of the spin injection layer 65a in the head travel direction D, film thickness T2 in a deep position away from the ABS 43 is greater than film thickness T1 in the end portion on the ABS 43 side. In the present embodiment, the film thickness of the spin injection layer 65a is increased in stages from the end on the ABS side to the upper end. The spin injection layer 65a is attached to the shield-side end surface 60c and the bottom surface 61a of the concave portion 61 via a non-magnetic conductive layer 67a.

In the third embodiment described above, an effect similar to that of the second embodiment can be obtained.

First Modification Example

FIG. 9 is an enlarged cross-sectional view taken along the track center of the distal end portion of the magnetic recording head in the HDD according to a first modification example. The first modification example shows a modification example of the third embodiment. In the first modification example, the upper end portion (deep portion) of the spin injection layer 65a extends to a position higher than the upper ends of an intermediate layer 65b and an oscillation layer 65c of the STO 65. This upper end portion is constant in film thickness T2 and is provided in the concave portion 61.

Second Modification Example

Figure 10:
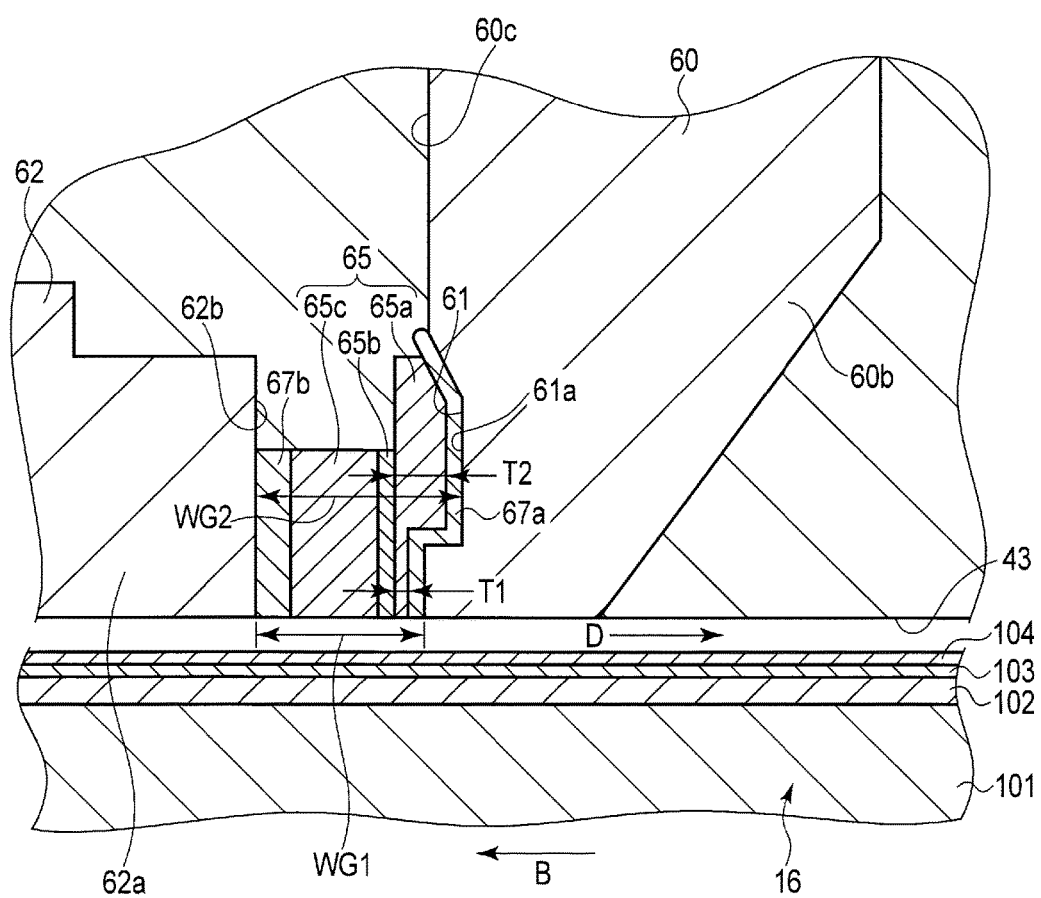
FIG. 10 is an enlarged cross-sectional view taken along the track center of the ABS-side end portion of the recording head of the HDD according to a second modification example.

FIG. 10 is an enlarged cross-sectional view taken along the track center of the distal end portion of the magnetic recording head in the HDD according to a second modification example. The second modification example shows a modification example of the third embodiment. The shape of the concave portion 61 is not limited to a rectangular shape and may be a trapezoidal shape on the cross-sectional surface as shown in the second modification example. In this manner, the spin injection layer 65a is gradually thicker from the ABS 43 side to the deep side. Subsequently, the spin injection layer 65a is constantly thick.

In the first and second modification examples described above, an effect similar to that of the second embodiment can be obtained.

Fourth Embodiment

FIG. 11 is an enlarged cross-sectional view taken along a track center of a distal end portion of a magnetic recording head in an HDD according to a fourth embodiment. In the present embodiment, in a distal end portion 60b of a main magnetic pole 60, a shield-side end surface 60c extends perpendicularly to an ABS. A concave portion 61 is formed in a position upwardly away from an ABS 43 (on the deep side) in the perpendicular direction on the shield-side end surface 60c. The concave portion 61 is recessed to the leading side and has a trapezoidal shape on the cross-sectional surface. A bottom surface 61a of the concave portion 61 is away toward the leading side from the shield-side end surface 60c and faces a leading-side end surface 62b of a trailing shield 62 substantially in parallel. In a write gap WG, gap length WG2 in a deep position away from the ABS 43 (in other words, the distance between the leading-side end surface 62b and the bottom surface 61a of the concave portion 61 along a travel direction D) is greater than gap length WG1 at the end on the ABS side.

A spin injection layer 65a of an STO 65 is provided in the concave portion 61 of the main magnetic pole 60. The upper end portion of the spin injection layer 65a extends to a position higher than the upper ends of an oscillation layer 65c and an intermediate layer 65b. The lower end of the spin injection layer 65a is located in the middle of the oscillation layer 65c in the height direction and is upwardly away from the ABS 43 in the perpendicular direction. The spin injection layer 65a is not present at the end on the ABS 43 side and is provided only in a deep position away from the ABS 43. With regard to the thickness of the spin injection layer 65a in the head travel direction D, film thickness T1 at the end on the ABS 43 side is zero, and film thickness T2 in a deep position away from the ABS 43 is great.

In the present embodiment, the spin injection layer 65a overlaps a part of the oscillation layer 65c, here, approximately the upper half of the oscillation layer 65c only in the gap length direction. The height distance (h1) between the middle position of the spin injection layer 65a in the height direction and the middle position of the oscillation layer 65c in the height direction is approximately 20 nm. The height size of the oscillation layer 65c is approximately 40 nm.

When the height distance of the region in which the spin injection layer 65a overlaps the oscillation layer 65c in the gap length direction is defined as coverage based on the height of the oscillation layer 65c (the height distance of the overlapped region/the height of the oscillation layer), the STO 65 of the present embodiment shows the example of coverage 50%.

Figure 12:
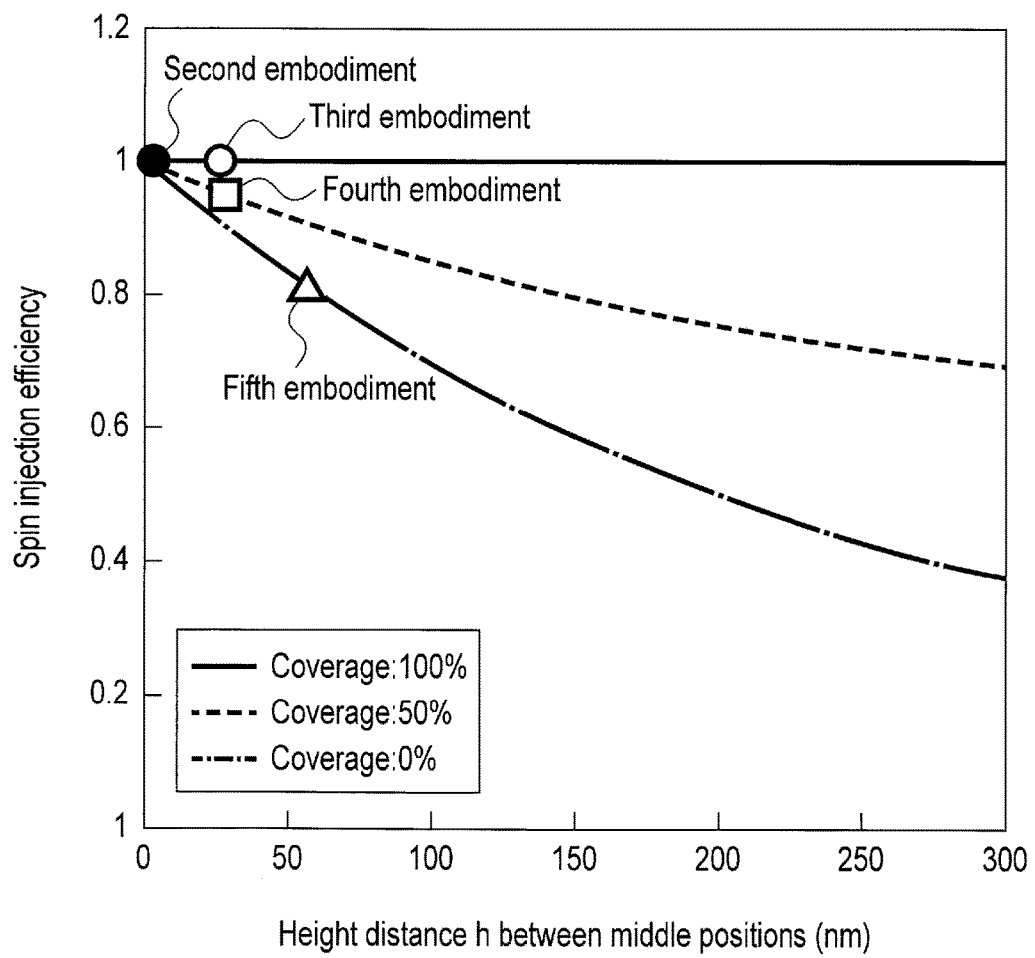
FIG. 12 is a view showing comparison of the spin injection efficiency with respect to recording heads of some embodiments.

FIG. 12 shows the spin injection efficiency of the oscillation layer of the STO. In FIG. 12, the horizontal axis indicates the height distance (h) between the middle position of the spin injection layer in the height direction and the middle position of the high-frequency oscillation layer in the height direction; and the vertical axis indicates the amount of electron spin injection flowing into the oscillation layer by reflection from the spin injection layer on the assumption that a case where the spin injection layer overlaps the whole surface of the oscillation layer is defined as spin injection efficiency 1 (100%). FIG. 12 also shows the relationship between the coverage defined above and the spin injection efficiency. When the spin injection efficiency is substantially greater than or equal to 0.5 (50%), the oscillation layer of the STO can obtain oscillation at a high frequency.

In the STO 65 of the second and third embodiments, the coverage is 100%. In the STO 65 of the fourth embodiment shown in FIG. 11, the coverage is 50%. As shown in FIG. 12, in the fourth embodiment having the coverage of 50%, the spin injection efficiency is 0.95 (95%). Thus, the spin injection efficiency is sufficient for oscillation of the oscillation layer.

In the fourth embodiment described above, an effect similar to that of the second embodiment can be obtained. The magnetization of the spin injection layer can easily point in the head travel direction in a uniform manner by providing the spin injection layer in a deep position away from the ABS and setting the film thickness in the ABS end so as to be zero and the film thickness in a deep position so as to be great. In this manner, the magnetization rotation of the oscillation layer is easily performed. Excellent oscillation is obtained. Moreover, gap length WG1 on the ABS 43 is less than gap length WG2 in a deep position. By this structure, the recording resolution of the recording head is improved. Thus, the line recording density of the magnetic disk is enhanced.

Fifth Embodiment

Figure 13:
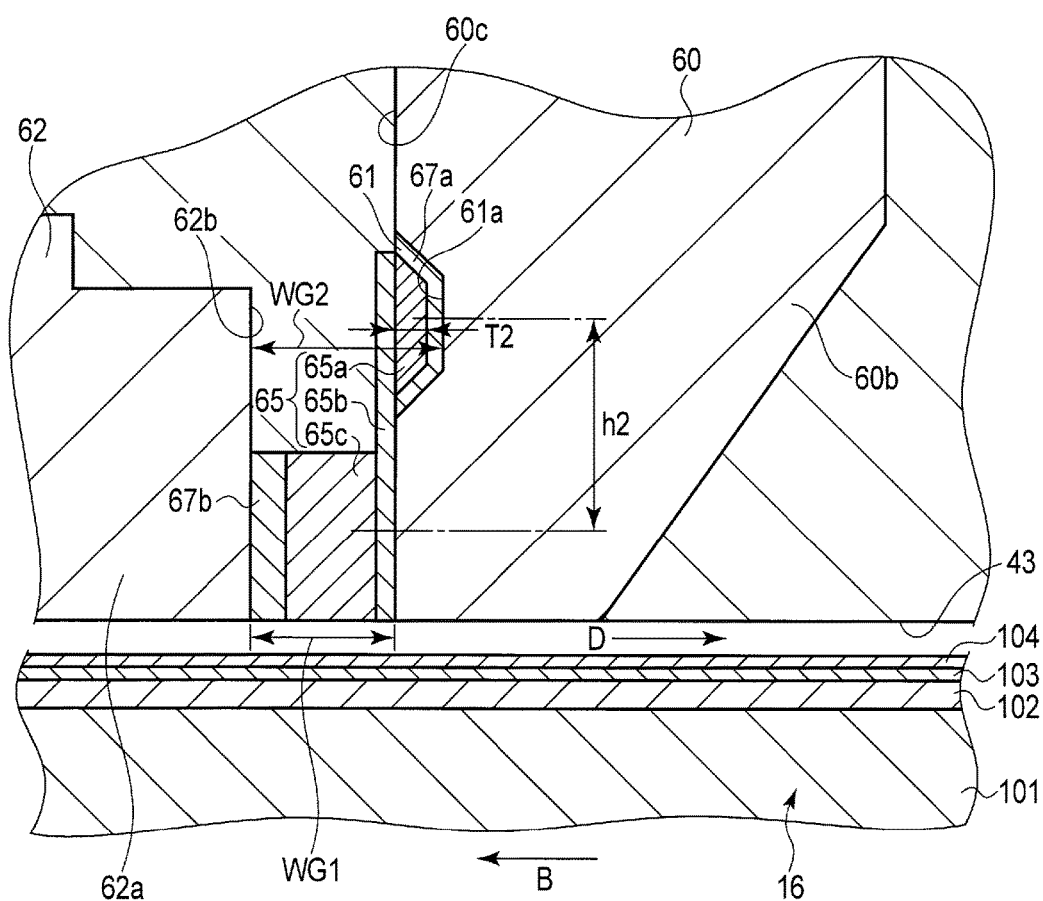
FIG. 13 is an enlarged cross-sectional view taken along a track center of an ABS-side end portion of a recording head of an HDD according to a fifth embodiment.

FIG. 13 is an enlarged cross-sectional view taken along a track center of a distal end portion of a magnetic recording head in an HDD according to a fifth embodiment. In the present embodiment, a concave portion 61 having a trapezoidal shape on the cross-sectional surface is formed on a shield-side end surface 60c in a distal end portion 60b of a main magnetic pole 60. The concave portion 61 is formed in a deep position away from an ABS 43 so as to be higher than the upper end of an oscillation layer 65c of an STO 65. A bottom surface 61a of the concave portion 61 is away toward the leading side from the shield-side end surface 60c and faces a leading-side end surface 62b of a trailing shield 62 substantially in parallel. In a write gap WG, gap length WG2 in a deep position away from the ABS 43 (in other words, the distance between the leading-side end surface 62b and the bottom surface 61a of the concave portion 61 along a travel direction D) is greater than gap length WG1 at the end on the ABS side.

A nonmagnetic conductive layer 67a and a spin injection layer 65a are provided in the concave portion 61. Thus, the spin injection layer 65a is located higher than the oscillation layer 65c and does not overlap the oscillation layer 65c at all in the gap length direction. The coverage is 0%. An intermediate layer 65b of the STO 65 extends from the ABS 43 to a position facing the spin injection layer 65a beyond the upper end of the oscillation layer 65c. Thus, the intermediate layer 65b is attached to the whole surface of the oscillation layer 65c and the whole surface of the spin injection layer 65a.

The spin injection layer 65a is not present at the end on the ABS 43 side and is provided only in a deep position away from the ABS 43. With regard to the thickness of the spin injection layer 65a in the head travel direction D, film thickness T1 at the end on the ABS 43 side is zero, and film thickness T2 in a deep position away from the ABS 43 is great.

In the present embodiment, the height distance (h2) between the middle position of the spin injection layer 65a in the height direction and the middle position of the oscillation layer 65c in the height direction is approximately 60 nm. The height size of the oscillation layer 65c is approximately 40 nm. The coverage is 0%. As shown in FIG. 12, the spin injection efficiency of the STO 65 of the fifth embodiment is 0.8 (80%). The figure shows that the spin injection efficiency is sufficient for oscillation of the oscillation layer 65c.

In the fifth embodiment, an effect similar to that of the fourth embodiment can be obtained.

Sixth Embodiment

FIG. 14 is an enlarged cross-sectional view taken along a track center of a distal end portion of a magnetic recording head in an HDD according to a sixth embodiment. In the present embodiment, a spin injection layer 65a, an intermediate layer (nonmagnetic conductive layer) 65b and an oscillation layer 65c of an STO 65 are stacked in order from the trailing shield 62 side to the main magnetic pole 60 side; in other words, along a travel direction D of a magnetic head. The spin injection layer 65a is attached to a leading-side end surface 62b of the trailing shield 62 via a nonmagnetic conductive layer (cap layer) 67b. The oscillation layer 65c is attached to a shield-side end surface 60c of the main magnetic pole 60 via a nonmagnetic conductive layer (foundation layer) 67a.

In a distal end portion 60b of the main magnetic pole 60, the shield-side end surface 60c extends substantially perpendicularly to an ABS 43. The leading-side end surface 62b of the trailing shield 62 extends substantially perpendicularly to the ABS 43 and faces the shield-side end surface 60c substantially in parallel. A cutout (concave portion) 82 is formed in a deep portion of the leading-side end surface 62b away from the ABS 43. The cutout 82 is recessed to the trailing side and has a rectangular shape on the cross-sectional surface. The cutout 82 faces a write gap WG. A bottom surface 82a of the cutout 82 is away toward the trailing side from the leading-side end surface 62b and faces the shield-side end surface 60c of the main magnetic pole 60 substantially in parallel. In the write gap WG, gap length WG2 in a deep position away from the ABS 43 (in other words, the distance between the shield-side end surface 60c and the bottom surface 82a of the cutout 82 along the travel direction D) is greater than gap length WG1 at the end on the ABS side.

The upper end (deep) portion of the spin injection layer 65a of the STO 65 away from the ABS 43 partially extends into the cutout 82. With regard to the thickness of the spin injection layer 65a in the head travel direction D, film thickness T2 in a deep position away from the ABS 43 is greater than film thickness T1 at the end on the ABS 43 side. In the present embodiment, the film thickness of the spin injection layer 65a is increased in stages from the end on the ABS 43 side to the upper end. The spin injection layer 65a is attached to the leading-side end surface 62b and the bottom surface 82a of the cutout 82 via the nonmagnetic conductive layer 67b. The spin injection layer 65a extends to a position above the upper end of the oscillation layer 65c.

In the sixth embodiment described above, an effect similar to that of the second embodiment can be obtained. Film thickness T2 of the spin injection layer in a deep position away from the ABS having a strong gap magnetic field strength is greater than film thickness T1 of the spin injection layer at the ABS end. By this structure, the magnetization of the spin injection layer can easily point in the head travel direction in a uniform manner. In this way, the magnetization rotation of the oscillation layer is easily performed. Excellent oscillation is obtained. Moreover, gap length WG1 on the ABS 43 is less than gap length WG2 in a deep position. This structure leads to enhancement of the recording resolution of the recording head and improvement of the line recording density of the magnetic disk.

Seventh Embodiment

FIG. 15 is an enlarged cross-sectional view taken along a track center of a distal end portion of a magnetic recording head in an HDD according to a seventh embodiment. In the present embodiment, a spin injection layer 65a, an intermediate layer (nonmagnetic conductive layer) 65b and an oscillation layer 65c of an STO 65 are stacked in order from the trailing shield 62 side to the main magnetic pole 60 side; in other words, along a travel direction D of a magnetic head. The spin injection layer 65a is attached to a leading-side end surface 62b of the trailing shield 62 via a nonmagnetic conductive layer (cap layer) 67b. The oscillation layer 65c is attached to a shield-side end surface 60c of the main magnetic pole 60 via a nonmagnetic conductive layer (foundation layer) 67a.

The leading-side end surface 62b of the trailing shield 62 extends substantially perpendicularly to an ABS 43 and faces the shield-side end surface 60c substantially in parallel. A concave portion or cutout 82 is formed in a deep portion of the leading-side end surface 62b away from the ABS 43. The cutout 82 is recessed to the trailing side and has a rectangular shape on the cross-sectional surface. A bottom surface 82a of the cutout 82 is away toward the trailing side from the leading-side end surface 62b and faces the shield-side end surface 60c of the main magnetic pole 60 substantially in parallel. In a write gap WG, gap length WG2 in a deep position away from the ABS 43 (in other words, the distance between the shield-side end surface 60c and the bottom surface 82a of the cutout 82 along the travel direction D) is greater than gap length WG1 at the end on the ABS side.

The spin injection layer 65a of the STO 65 is provided in the cutout 82 of the trailing shield 62. The upper end portion of the spin injection layer 65a and the upper end portion of the intermediate layer 65b extend to a position higher than the upper end of the oscillation layer 65c. The lower end of the spin injection layer 65a is located in the middle of the oscillation layer 65c in the height direction and is upwardly away from the ABS 43 in the perpendicular direction. The spin injection layer 65a is not present at the end on the ABS 43 side and is provided only in a deep position away from the ABS 43. With regard to the thickness of the spin injection layer 65a in the head travel direction D, film thickness T1 at the end on the ABS 43 side is zero, and film thickness T2 in a deep position away from the ABS 43 is great.

In the seventh embodiment described above, an effect similar to that of the sixth embodiment can be obtained.

Eighth Embodiment

FIG. 16 is an enlarged cross-sectional view taken along a track center of a distal end portion of a magnetic recording head in an HDD according to an eighth embodiment. In the present embodiment, a cutout 82 is formed on a leading-side end surface 62b of a trailing shield 62. The cutout 82 is formed in a deep position away from an ABS 43 so as to be higher than the upper end of an oscillation layer 65c of an STO 65. A bottom surface 82a of the cutout 82 is away toward the trailing side from the leading-side end surface 62b and faces a shield-side end surface 60c of a main magnetic pole 60 substantially in parallel. In this manner, in a write gap WG, gap length WG2 in a deep position away from the ABS 43 is greater than gap length WG1 at the end on the ABS side.

A nonmagnetic conductive layer 67b and a spin injection layer 65a are provided in the cutout 82. The spin injection layer 65a is located higher than the oscillation layer 65c and does not overlap the oscillation layer 65c in the gap length direction. The coverage is 0%. An intermediate layer 65b of the STO 65 extends from an ABS 43 to a position facing the spin injection layer 65a beyond the upper end of the oscillation layer 65c. Thus, the intermediate layer 65b is attached to the whole surface of the oscillation layer 65c and the whole surface of the spin injection layer 65a.

The spin injection layer 65a is not present at the end on the ABS 43 side and is provided only in a deep position away from the ABS 43. With regard to the thickness of the spin injection layer 65a in a head travel direction D, film thickness T1 at the end on the ABS 43 side is zero, and film thickness T2 in a deep position away from the ABS 43 is great. In the present embodiment, the spin injection efficiency of the STO 65 is approximately 0.8. Thus, the spin injection efficiency is sufficient for oscillation of the oscillation layer 65c.

In the eighth embodiment, an effect similar to that of the sixth embodiment can be obtained.

Ninth Embodiment

Figure 17:
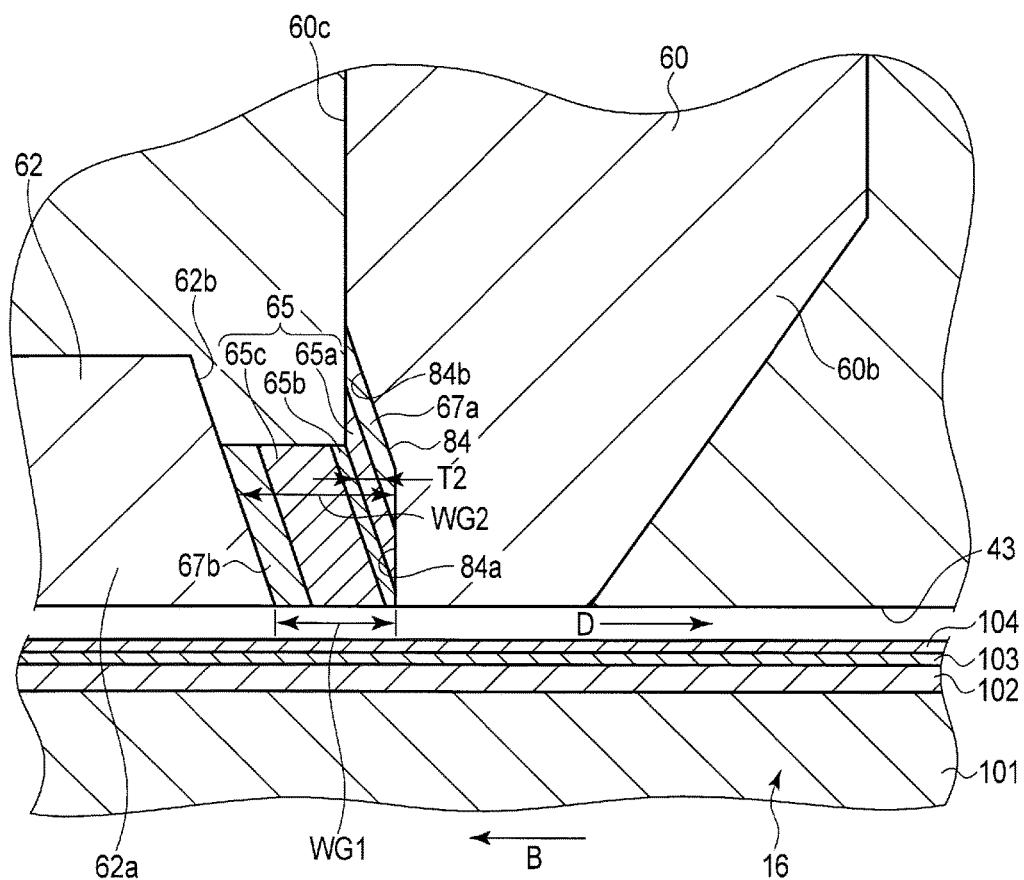
FIG. 17 is an enlarged cross-sectional view taken along a track center and shows an enlarged view of an ABS-side end portion of a recording head of an HDD according to a ninth embodiment.

FIG. 17 is an enlarged cross-sectional view taken along a track center of a distal end portion of a magnetic recording head in an HDD according to a ninth embodiment. In the present embodiment, a cutout 84 is formed in the lower end portion which makes contact with an ABS 43 in a shield-side end surface 60c of a main magnetic pole 60. The cutout 84 comprises: a bottom surface 84a substantially perpendicularly extending from the ABS 43; and a tapered surface 84b inclining toward the trailing side from the upper end of the bottom surface to the shield-side end surface 60c. A leading-side end surface 62b of a trailing shield 62 inclines toward the trailing side from the ABS 43 to the upper part and forms a tapered surface. In a write gap WG formed between the distal end portion of the main magnetic pole 60 and a distal end portion 62a of the trailing shield 62, gap length WG2 in a deep position away from the ABS 43 is greater than gap length WG1 on the ABS 43.

An STO 65 is provided between a distal end portion 60b of the main magnetic pole 60 and the trailing shield 62 in the write gap WG and is partially exposed to the ABS 43. The STO 65 comprises a spin injection layer 65a, an intermediate layer (nonmagnetic conductive layer) 65b and an oscillation layer 65c. On the ABS 43, the intermediate layer 65b, the oscillation layer 65c and a nonmagnetic conductive layer 67b are stacked in order from the shield-side end surface 60c of the main magnetic pole 60. In a deep position upwardly away from the ABS 43, a nonmagnetic conductive layer 67a, the spin injection layer 65a, the intermediate layer 65b, the oscillation layer 65c and the nonmagnetic conductive layer 67b are stacked in order from the main magnetic pole 60 side between the bottom surface 84a or the tapered surface 84b of the cutout 84 and the leading-side end surface 62b of the trailing shield 62.

The nonmagnetic conductive layer 67a, the spin injection layer 65a, the intermediate layer 65b, the oscillation layer 65c and the nonmagnetic conductive layer 67b incline toward the trailing side from the ABS 43 to the upper part along the inclination of the tapered surface 84b and the leading-side end surface 62b. The nonmagnetic conductive layer 67a, the spin injection layer 65a and the intermediate layer 65b are formed in the cutout 84. Thus, the lower end of the spin injection layer 65a is upwardly away from the ABS 43 in the perpendicular direction. The spin injection layer 65a is not present at the end on the ABS 43 side and is provided only in a deep position away from the ABS 43. With regard to the thickness of the spin injection layer 65a in the head travel direction D, film thickness T1 on the ABS 43 is zero, and film thickness T2 in a deep position away from the ABS 43 is great.

According to the ninth embodiment described above, the spin injection layer 65a is provided in a position where the gap magnetization field produced between the main magnetic pole 60 and the trailing shield 62 on the deep side in the height direction is strong. The magnetization of the spin injection layer 65a easily points in the film surface perpendicular direction of the spin injection layer in a uniform manner. In this way, the magnetization rotation of the oscillation layer 65c is easily performed. Excellent oscillation is obtained. Further, gap length WG1 on the ABS 43 is less than gap length WG2 in a deep position. This structure leads to enhancement of the recording resolution and improvement of the line recording density.

Tenth Embodiment

FIG. 18 is an enlarged cross-sectional view taken along a track center of a distal end portion of a magnetic recording head in an HDD according to a tenth embodiment. In the present embodiment, a cutout 84 is formed at the lower end of a shield-side end surface 60c of a main magnetic pole 60. The cutout 84 forms: a first tapered surface 84c inclining toward the trailing side from an ABS 43 to the upper part; a bottom surface 84a extending from the upper end of the first tapered surface substantially perpendicularly to the ABS 43; and a second tapered surface 84b inclining toward the trailing side from the upper end of the bottom surface 84a to the shield-side end surface 60c. A leading-side end surface 62b of a trailing shield 62 inclines toward the trailing side from the ABS 43 to the upper part and forms a tapered surface. In a write gap WG formed between the distal end portion of the main magnetic pole 60 and a distal end portion 62a of the trailing shield 62, gap length WG2 in a deep position away from the ABS 43 is greater than gap length WG1 on the ABS 43.

An STO 65 is provided between a distal end portion 60b of the main magnetic pole 60 and the trailing shield 62 in the write gap WG and is partially exposed to the ABS 43. On the ABS 43, an intermediate layer 65b, an oscillation layer 65c and a nonmagnetic conductive layer 67b are stacked in order from the shield-side end surface of the main magnetic pole 60. In a deep position upwardly away from the ABS 43, a nonmagnetic conductive layer 67a, a spin injection layer 65a, the intermediate layer 65b, the oscillation layer 65c and the nonmagnetic conductive layer 67b are stacked in order from the main magnetic pole 60 side between the bottom surface 84a or the second tapered surface 84b of the cutout 84 and the leading-side end surface 62b of the trailing shield 62.

The nonmagnetic conductive layer 67a, the spin injection layer 65a, the intermediate layer 65b, the oscillation layer 65c and the nonmagnetic conductive layer 67b incline toward the trailing side from the ABS 43 to the upper part along the inclination of the tapered surface 84b and the leading-side end surface 62b. The nonmagnetic conductive layer 67a, the spin injection layer 65a and the intermediate layer 65b are formed in the cutout 84. Thus, the lower end of the spin injection layer 65a is upwardly away from the ABS 43 in the perpendicular direction. The spin injection layer 65a is not present at the end on the ABS 43 side and is provided only in a deep position away from the ABS 43. With regard to the thickness of the spin injection layer 65a in a head travel direction D, film thickness T1 on the ABS 43 is zero, and film thickness T2 in a deep position away from the ABS 43 is great.

In the tenth embodiment, an effect similar to that of the ninth embodiment can be obtained.

Eleventh Embodiment

Figure 19:
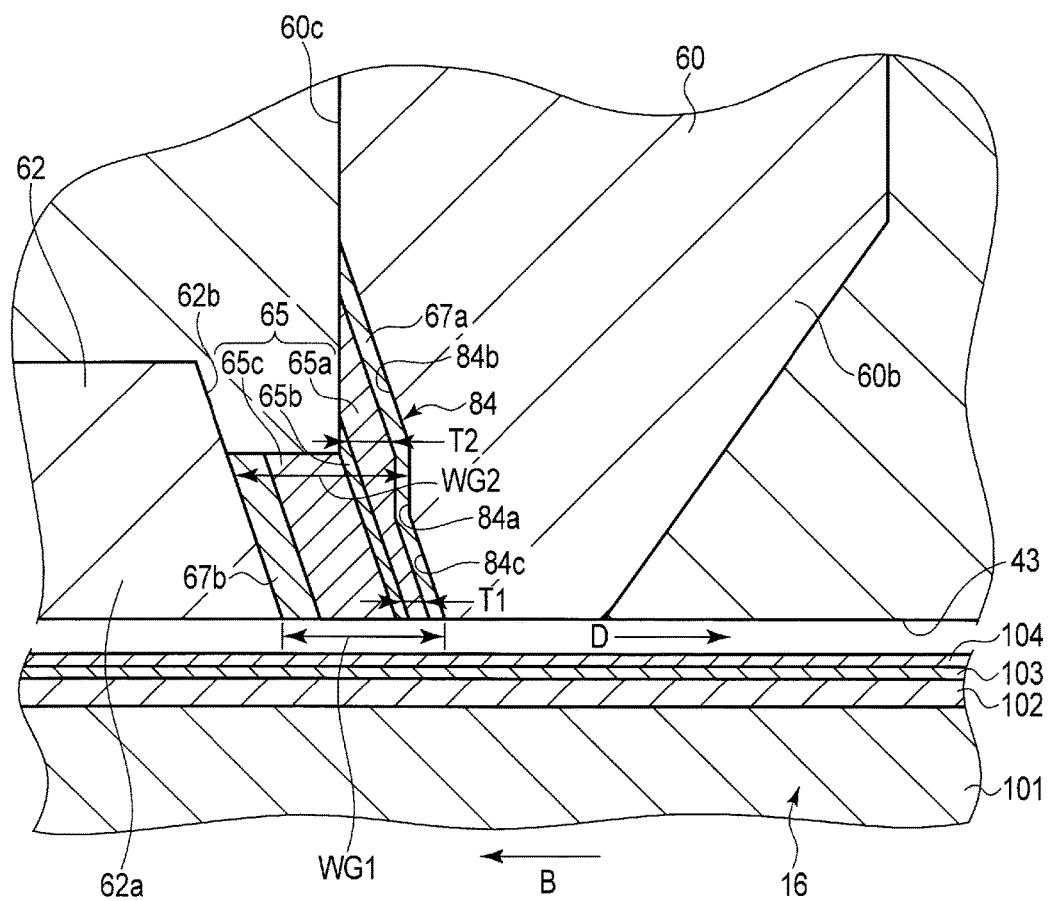
FIG. 19 is an enlarged cross-sectional view taken along a track center of an ABS-side end portion of a recording head of an HDD according to an eleventh embodiment.

FIG. 19 is an enlarged cross-sectional view taken along a track center of a distal end portion of a magnetic recording head in an HDD according to an eleventh embodiment. In the present embodiment, similarly to the tenth embodiment, a cutout 84 is formed in the lower end of a shield-side end surface 60c of a main magnetic pole 60. The cutout 84 forms: a first tapered surface 84c inclining toward the trailing side from an ABS 43 to the upper part; a bottom surface 84a extending from the upper end of the first tapered surface substantially perpendicularly to the ABS 43; and a second tapered surface 84b inclining toward the trailing side from the upper end of the bottom surface 84a to the shield-side end surface 60c.

In the present embodiment, a spin injection layer 65a, an intermediate layer 65b and a nonmagnetic conductive layer 67a of the STO 65 are provided in the cutout 84 and extend to the ABS 43. On the ABS 43, the nonmagnetic conductive layer 67a, the spin injection layer 65a, the intermediate layer 65b, an oscillation layer 65c and a nonmagnetic conductive layer 67b are stacked in order from the shield-side end surface of the main magnetic pole 60. In a deep position upwardly away from the ABS 43, the nonmagnetic conductive layer 67a, the spin injection layer 65a, the intermediate layer 65b, the oscillation layer 65c and the nonmagnetic conductive layer 67b are stacked in order from the main magnetic pole 60 side between the bottom surface 84a or the second tapered surface 84b of the cutout 84 and a leading-side end surface 62b of a trailing shield 62.

With regard to the thickness of the spin injection layer 65a in a head travel direction D, film thickness T1 on the ABS 43 is greater than film thickness T2 in a deep position away from the ABS 43. In a write gap WG formed between the distal end portion of the main magnetic pole 60 and a distal end portion 62a of the trailing shied 62, gap length WG2 in a deep position away from the ABS 43 is greater than gap length WG1 on the ABS 43.

The other structures of the eleventh embodiment are the same as those of the tenth embodiment. In the eleventh embodiment, an effect similar to that of the ninth embodiment can be obtained.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

For example, the materials, shapes and sizes of elements constituting the head portion can be changed depending on the need. In the magnetic disk device, the number of magnetic disks and magnetic heads can be increased depending on the need. The size of the magnetic disks can be selected in various ways.

What is claimed is:

1. A magnetic recording head comprising:
   an air bearing surface;
   a magnetic pole which comprises a distal end portion extending to the air bearing surface and is configured to produce a recording magnetic field;
   a write shield opposed to the distal end portion of the magnetic pole across a write gap; and
   a high-frequency oscillator provided between the magnetic pole and the write shield in the write gap and connected to the magnetic pole and the write shield, wherein
   the high-frequency oscillator comprises a spin injection layer, an intermediate layer and an oscillation layer which are stacked in a head travel direction, and each of the oscillation layer and the spin injection layer comprises a stack surface extending in a direction intersecting with the air bearing surface, and
   a film thickness of the spin injection layer in the head travel direction at a height position away from the air bearing surface is greater than a film thickness of the spin injection layer in the head travel direction on the air bearing surface.

2. The magnetic recording head of claim 1, wherein a gap length of the write gap in the head travel direction on the air bearing surface is less than a gap length in the head travel direction at a height position away from the air bearing surface in the write gap.

3. The magnetic recording head of claim 2, wherein the spin injection layer includes an end portion exposed to the air bearing surface.

4. The magnetic recording head of claim 2, wherein the spin injection layer is provided in the height position away from the air bearing surface.

5. The magnetic recording head of claim 2, wherein the spin injection layer, the intermediate layer and the oscillation layer are stacked in order from a magnetic pole side to the write shield.

6. The magnetic recording head of claim 5, wherein the magnetic pole comprises a shield-side end surface facing the write shield, and an end portion of the shied-side end surface on an air bearing surface side extends from the magnetic pole to the air bearing surface with inclination toward a write shield side.

7. The magnetic recording head of claim 5, wherein the magnetic pole comprises a shield-side end surface facing the write shield, and a concave portion formed on the shield-side end surface in a height position away from the air bearing surface, and
   a gap length between a bottom surface of the concave portion and the write shield is greater than the gap length on the air bearing surface.

8. The magnetic recording head of claim 7, wherein at least a part of the spin injection layer is provided in the concave portion in a height position away from the air bearing surface.

9. The magnetic recording head of claim 5, wherein the write shield comprises a magnetic-pole-side end surface facing the magnetic pole, and
   the magnetic-pole-side end surface inclines in a direction away from the magnetic pole from the air bearing surface relative to a direction perpendicular to the air bearing surface.

10. The magnetic recording head of claim 1, wherein the spin injection layer includes an end portion exposed to the air bearing surface.

11. The magnetic recording head of claim 1, wherein the spin injection layer is provided in the height position away from the air bearing surface.

12. The magnetic recording head of claim 1, wherein the spin injection layer, the intermediate layer and the oscillation layer are stacked in order from a magnetic pole side to the write shield.

13. The magnetic recording head of claim 12, wherein the magnetic pole comprises a shield-side end surface facing the write shield, and an end portion of the shied-side end surface on an air bearing surface side extends from the magnetic pole to the air bearing surface with inclination toward a write shield side.

14. The magnetic recording head of claim 2, wherein the spin injection layer, the intermediate layer and the oscillation layer are stacked in order from a write shield side to the magnetic pole.

15. The magnetic recording head of claim 14, wherein the write shield comprises a magnetic-pole-side end surface facing the magnetic pole, and a concave portion formed on the magnetic-pole-side end surface in a height position away from the air bearing surface, and a gap length between a bottom surface of the concave portion and the magnetic pole is greater than the gap length on the air bearing surface.

16. The magnetic recording head of claim 15, wherein at least a part of the spin injection layer is provided in the concave portion in the height position away from the air bearing surface.

17. A disk device comprising:

a discoid recording medium comprising a magnetic recording layer; and the magnetic recording head of claim 1, configured to write recording data to the recording medium.

18. The disk drive of claim 17, wherein a gap length of the write gap in the head travel direction on the air bearing surface is less than a gap length in the head travel direction at a height position away from the air bearing surface in the write gap.

19. The disk drive of claim 17, wherein the spin injection layer includes an end portion exposed to the air bearing surface.

20. The disk drive of claim 17, wherein the spin injection layer is provided in the height position away from the air bearing surface.

* * * * *